(12) United States Patent
Kuroi et al.

(10) Patent No.: US 7,864,418 B2
(45) Date of Patent: Jan. 4, 2011

(54) SCREEN

(75) Inventors: Kiyoshi Kuroi, Matsumoto (JP); Hiroyuki Shindo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/466,438

(22) Filed: May 15, 2009

(65) Prior Publication Data
US 2009/0302176 A1 Dec. 10, 2009

(30) Foreign Application Priority Data
Jun. 9, 2008 (JP) .............................. 2008-150420
Sep. 26, 2008 (JP) .............................. 2008-248090

(51) Int. Cl.
*G03B 21/56* (2006.01)
(52) U.S. Cl. ................. 359/443; 359/460; 160/377
(58) Field of Classification Search .............. 359/443, 359/461; 160/377
See application file for complete search history.

(56) References Cited

U.S. PATENT DOCUMENTS 7,180,665 B2 * 2/2007 Daniel et al. ................ 359/461
7,397,603 B2 * 7/2008 Peterson et al. ............. 359/443
7,623,290 B2 * 11/2009 Liang et al. ................. 359/443
2006/0279840 A1 * 12/2006 Yamauchi ................... 359/461

FOREIGN PATENT DOCUMENTS

| JP | 04-264436 | 9/1992 |
| JP | 06-003746 | 1/1994 |
| JP | 2003-015225 | 1/2003 |
| JP | 2004-046078 | 2/2004 |

* cited by examiner

*Primary Examiner*—Christopher Mahoney
(74) *Attorney, Agent, or Firm*—AdvantEdge Law Group, LLC

(57) ABSTRACT

A screen includes a screen main body, having flexibility, onto which an image light is projected; a first support and a second support which, extending one along each of a pair of opposed edges of the screen main body, each support one of the pair of edges; an auxiliary support which, being disposed between the first support and the second support, extends parallel to the first support and the second support, and supports a pair of intersecting edges intersecting with the pair of edges of the screen main body; and linkage mechanisms which, bridging adjacent supports, among the first support, second support, and auxiliary support, as well as regulating a movement of the adjacent supports in an out-of-plane direction of a projection surface of the screen main body, extend and contract in a direction in which the adjacent supports face each other, bringing the adjacent supports closer to and away from each other.

19 Claims, 24 Drawing Sheets

SCREEN

BACKGROUND

1. Technical Field

The present invention relates to a screen.

2. Related Art

To date, various kinds of screen have been proposed, each of which includes a sheet-like screen main body having flexibility, wherein an image light projected and magnified from a projector or the like is projected onto a projection surface of the screen main body.

With this kind of screen, as the sheet-like screen main body is employed, it is necessary to suppress a deflection and undulation of the screen main body, and maintain the flatness of the projection surface. Therein, the following technology has heretofore been proposed which suppresses a deflection and undulation of the screen main body (for example, refer to JP-A-4-264436).

A screen described in JP-A-4-264436 is configured of a screen (hereafter described as a stationary screen) in which a projection surface is always formed in a condition in which a pair of opposed edges of a screen main body is supported. More specifically, the screen described in JP-A-4-264436 includes a fixed edge and movable edge which each support one of the two up-down (vertical) direction edges of the screen main body, a tension application mechanism which moves the movable edge, changing the up-down direction tension of the screen main body, a sensor which detects a change in tension of the screen main body, and a drive control circuit which controls the tension application mechanism in accordance with an output of the sensor. By means of this kind of configuration, tension is applied to the screen main body in an up-down direction, suppressing a deflection and undulation of the screen main body.

However, with the technology described in JP-A-4-264436, although both up-down direction edges of the screen main body are fixed, as the screen is in a condition in which both left-right (horizontal) direction edges of the screen main body are released, it is impossible to prevent a deflection and undulation of both left-right direction edges. That is, there is a problem in that it is impossible to efficiently maintain the flatness of the projection surface.

Also, with the technology described in JP-A-4-264436, as the screen is configured as a stationary screen, the screen is in a condition in which the projection surface is formed even when the screen is not used, so there is a problem in that the screen is difficult to carry about.

SUMMARY

An advantage of some aspects of the invention is to provide a screen which, as well as being able to efficiently maintain the flatness of a projection surface, can be easily carried about.

A screen of one aspect of the invention includes a screen main body, having flexibility, onto which an image light is projected; a first support and a second support which, extending one along each of a pair of opposed edges of the screen main body, each support one of the pair of edges; an auxiliary support which extends parallel to the first support and the second support, and supports a pair of intersecting edges intersecting with the pair of edges of the screen main body; and linkage mechanisms which, bridging adjacent supports, among the first support, second support, and auxiliary support, as well as regulating a movement of the adjacent supports in an out-of-plane direction of a projection surface of the screen main body, extend and contract in a direction in which the adjacent supports face each other, bringing the adjacent supports closer to and away from each other.

Herein, as the linkage mechanisms, it also being acceptable to employ any configuration as long as it has the heretofore described function, it is possible to exemplify, for example, with retractable rod mechanisms.

Also, as the first support and second support, it is also acceptable to adopt a configuration wherein each of them supports one of the two up-down direction edges of the screen main body, or it is also acceptable to adopt a configuration wherein each of them supports one of the two left-right direction edges of the screen main body.

Hereafter, in order to simplify description, a description will be given employing the configuration wherein each of the first support and second support supports one of the two up-down direction edges of the screen main body.

In the aspect of the invention, the screen includes the auxiliary support and the linkage mechanisms, apart from the screen main body, first support, and second support.

Then, the linkage mechanisms extend and contract in an up-down direction (a direction in which the adjacent supports face each other), bringing the adjacent supports closer to and away from each other. By this means, by bringing the first support and second support a predetermined distance away from each other by means of the linkage mechanisms, as well as a condition in which the projection surface is formed (hereafter described as a stretched condition) being set, it is possible to apply tension to the screen main body in an up-down direction.

Also, the auxiliary support supports both left-right direction edges (the pair of intersecting edges) of the screen main body. By this means, by causing the auxiliary support to support both left-right direction edges in a condition in which tension is applied to the screen main body in a left-right direction, it is possible, in the stretched condition too, to efficiently maintain left-right direction tension applied to the screen main body by means of the auxiliary support.

Furthermore, the linkage mechanisms regulate a movement of the adjacent supports in an out-of-plane direction of the projection surface. By this means, in the screen main body, it is possible to efficiently maintain a position thereof supported by the adjacent supports against a movement in an out-of-plane direction of the projection surface.

As heretofore described, as tension is applied to the screen main body in an up-down direction and left-right direction by the adjacent supports while suppressing a flapping of the adjacent supports in an out-of-plane direction of the projection surface by means of the linkage mechanisms, it is possible, in the stretched condition, to effectively prevent a deflection and undulation of the screen main body, efficiently maintaining the flatness of the projection surface.

Also, when the screen is not used, by bringing the adjacent supports closer to each other by means of the linkage mechanisms, the screen is reduced in size, and the screen can be easily carried about.

In the screen according to the aspect of the invention, it is preferable that the screen includes a housing, disposed on the second support side, inside which the screen main body, adjacent supports, and linkage mechanisms are housed in a condition in which the adjacent supports are close to each other; and a first support fixing mechanism which, when the first support is taken out of the housing, is connected to the housing and the first support, fixing a distancing position of the first support from the housing.

Herein, as the first support fixing mechanism, it is possible to exemplify, for example, with a pantograph mechanism.

In the aspect of the invention, as the screen includes the housing, a condition in which the screen main body, adjacent supports, and linkage mechanisms are housed inside the housing being attained when the screen is not used, as well as it being possible to make the external appearance favorable, it is possible to more easily carry the screen.

Also, the screen includes the first support fixing mechanism which, in the stretched condition, is connected to the housing and the first support, fixing the distancing position of the first support from the housing. By this means, for example, when setting the stretched condition, it not being necessary to fix the first support to a floor plane or a ceiling plane by means of a wire or the like, it is possible to easily implement the setting of the stretched condition.

In the screen according to the aspect of the invention, it is preferable that the screen includes a second support regulation mechanism which, when the first support is taken out of the housing, is connected to the housing and the second support, regulating a movement of the second support in a direction away from the housing.

Meanwhile, in the stretched condition, the distancing position of the first support from the housing is fixed by the first support fixing mechanism. However, as the adjacent supports are connected by only the linkage mechanisms and screen main body, a movement of the second support in a direction away from the housing (for example, in an up-down direction) is unrestricted.

In the aspect of the invention, as the screen includes the second support regulation mechanism, it is possible, in the stretched condition, to regulate a movement of the second support in a direction away from the housing by means of the second support regulation mechanism. That is, in the stretched condition, by positioning the second support in a predetermined distancing position from the housing by means of the second support regulation mechanism, it is possible to bring the first support and the second support a predetermined distance away from each other, applying a desired tension to the screen main body in an up-down direction.

In the screen according to the aspect of the invention, it is preferable that the second support regulation mechanism is configured in such a way as to be able to change a distancing position of the second support from the housing.

In the aspect of the invention, as the second support regulation mechanism is configured in the way heretofore described, it is possible, in the stretched condition, to change the distancing position of the second support from the housing, that is, a distance between the first support and the second support, appropriately adjusting the up-down direction tension applied to the screen main body.

In the screen according to the aspect of the invention, it is preferable that an insertion hole, passing through in a direction in which the adjacent supports face each other, through which to insert one portion of the second support regulation mechanism, is formed in the second support, and that the second support regulation mechanism includes a restriction body, one end of which is connected to the housing, and an adjustment body which comes into threaded engagement with the other end of the restriction body, wherein the adjustment body, when the first support is taken out of the housing, as well as coming into abutment with a peripheral portion of the insertion hole, regulating a movement of the second support in a direction away from the housing, moves closer to and away from the housing by a condition of threaded engagement with the restriction body being changed, changing the distancing position of the second support from the housing.

In the aspect of the invention, as the second support regulation mechanism includes the restriction body and the adjustment body, while making the second support regulation mechanism a simple structure, it is possible, in the stretched condition, to easily implement a regulation of a movement of the second support in a direction away from the housing, and a change of the distancing position of the second support from the housing, by means of the second support regulation mechanism.

In the screen according to the aspect of the invention, it is preferable that the screen includes a reception member of which one end is fixed to the peripheral portion of the insertion hole, and the other end comes into abutment with the adjustment body, wherein at least one of the adjustment body and reception member has a tapered surface coming into abutment with the other.

Meanwhile, for example, in the event that the restriction body is configured of a rod mechanism configured of a plurality of tubular members which, differing in diameter from one another, are inserted one into a tubular interior of another, there is a fear of the following problem occurring.

For example, in the event that a looseness occurs between the tubular members, when setting the stretched condition, the restriction body attains a condition in which it is tilted relative to an up-down direction due to the looseness. In this condition, on the adjustment body coming into abutment with the periphery portion of the insertion hole, as well as force being applied to the second support in a direction away from the first support, force is also applied in a direction depending on the tilting of the restriction body. For this reason, the second support is displaced in a left-right direction, and it is difficult to efficiently maintain the flatness of the screen main body.

In the aspect of the invention, in the stretched condition, the adjustment body comes into abutment with the reception member fixed to the peripheral portion of the insertion hole. Then, at least one of the adjustment body and reception member has a tapered surface in abutment with the other. By this means, for example, even in the event that the restriction body is configured of the rod mechanism, and a looseness occurs between the tubular members, it being possible, in the stretched condition, to put the restriction body into a condition in which it is oriented in an up-down direction without being tilted when the adjustment body and the reception member come into abutment with each other, it is possible to only apply force to the second support in a direction away from the first support. That is, it not happening that the second support is displaced in a left-right direction, it is possible to efficiently maintain the flatness of the screen main body.

In the screen according to the aspect of the invention, it is preferable that the screen includes entanglement prevention mechanisms which, bridging the adjacent supports, in a condition in which the adjacent supports are close to each other, bend to the screen main body side, and press the screen main body to the front side.

In the aspect of the invention, as the screen includes the entanglement prevention mechanisms, on the supports moving closer to each other from the stretched condition, the entanglement prevention mechanisms bend to the screen main body side, enabling the entanglement prevention mechanisms to press the screen main body to the front side. For this reason, when the screen is not used, when setting a condition in which the adjacent supports are brought close to each other, it being possible to prevent the screen main body from being caught between the adjacent supports, it is possible to prevent rumples or the like from occurring in the screen main body.

In the screen according to the aspect of the invention, it is preferable that the first support and the second support each support one of the pair of horizontally intersecting edges of the screen main body, and that, in a condition in which the screen is installed on a floor plane in an installation space of the screen, the lower ends of the adjacent supports come into abutment with the floor plane.

Meanwhile, in the case of adopting a configuration wherein the first support and the second support each support one of the two up-down direction edges of the screen main body, as the adjacent supports are connected by only the linkage mechanisms and screen main body, the self-weight of the adjacent supports and linkage mechanisms is applied to the screen main body. In particular, in the screen main body, as the self-weight of all the adjacent supports and linkage mechanisms is applied to the upper side of the screen main body, the up-down direction tension differs between the upper side and the lower side. That is, the flatness of the screen main body differs between the upper side thereof and the lower side, depending on the self-weight of the adjacent supports and linkage mechanisms.

In the aspect of the invention, the first support and the second support each support both left-right direction edges of the screen main body. Then, the lower ends of the adjacent supports come into abutment with the floor plane in a condition in which the screen is installed on the floor plane. By this means, it being possible to prevent the self-weight of the adjacent supports and linkage mechanisms from being applied to the screen main body, it is possible to make flatness uniform all over the screen main body.

In the screen according to the aspect of the invention, it is preferable that the first support and the second support each support the pair of horizontally intersecting edges of the screen main body, and that the screen includes a rail member which, extending toward the first support from the second support, supports the lower ends of the adjacent supports, wherein the first support and the auxiliary support slide on the rail member.

In the aspect of the invention, the first support and the second support each support both left-right direction edges of the screen main body. Then, the lower ends of the adjacent supports are supported by the rail member. By this means, it being possible to prevent the self-weight of the adjacent supports and linkage mechanisms from being applied to the screen main body, it is possible to make flatness uniform all over the screen main body.

Also, as the first support and the auxiliary support slide on the rail member, it is possible to easily set the stretched condition or a condition in which the adjacent supports are brought close to each other.

In the screen according to the aspect of the invention, it is preferable that the screen includes a regulation member which, having flexibility, bridges the rear surfaces of the adjacent supports, wherein the regulation member regulates the curving of the screen main body toward the rear side in a stretched condition in which the first support and the second support are away from each other, and tension is applied to the screen main body.

Meanwhile, in the heretofore described aspect of the invention, a configuration is such that the screen main body which keeps a distance between the adjacent supports constant is connected to the front surfaces of the adjacent supports, but only the linkage mechanisms are attached to the rear surfaces of the adjacent supports, one between each pair of the adjacent supports. In this configuration, for example, in the case of applying tension to the screen main body, a movement of the screen main body in an up-down direction is not regulated because of the structure of the linkage mechanisms, and the adjacent supports on the rear surface side of the screen main body move in a direction away from each other. For this reason, there is a fear of the screen main body being curved to the rear side, reducing the flatness of the screen main body.

In the aspect of the invention, the regulation member which regulates the screen main body being curved toward the rear side bridges the rear surface of the screen main body. By this means, it being possible, in the stretched condition, for the regulation member to suppress an increase in distance between the adjacent supports, suppressing the curving of the screen main body to the rear side, it is possible to prevent a reduction in flatness of the screen main body.

In the screen according to the aspect of the invention, it is preferable that the adjacent supports have identical approximately rectangular shapes in cross-section, and the regulation member, in the stretched condition, sets a rear corner-to-corner dimension between mutually opposed corners of the adjacent supports on the rear side so as to be approximately identical to a front corner-to-corner dimension between mutually opposed corners of the adjacent supports on the front side.

In the aspect of the invention, the regulation member, in the stretched condition, sets support-to-support dimensions on the front surface side and rear surface side of the screen main body (the front corner-to-corner dimension and the rear corner-to-corner dimension) so as to be approximately identical to each other. By this means, it is possible to suppress an increase in the rear corner-to-corner dimension which occurs in the stretched condition, preventing a reduction in flatness of the screen main body.

In the screen according to the aspect of the invention, it is preferable that the screen includes an adjustment mechanism on the rear surface of at least one of the adjacent supports, wherein one end of the regulation member is connected to the adjustment mechanism, the other end of the regulation member is connected to the rear surface of the support differing from the one support, and the adjustment mechanism causes one end side of the regulation member to move in and out in a direction in which the adjacent supports move closer to and away from each other, changing the rear corner-to-corner dimension.

In the aspect of the invention, one end of the regulation member is connected to the adjustment mechanism, and the other end of the regulation member is connected to the support differing from the support to which the adjustment mechanism is fixed. By this means, by moving one end side of the regulation member in a direction in which the adjacent supports move closer to and away from each other by operating the adjustment mechanism, it being possible to freely adjust the rear corner-to-corner dimension in accordance with a degree of curvature of the screen main body, it is possible to improve the flatness of the screen main body.

In the screen according to the aspect of the invention, it is preferable that the first support is installed on one of a floor plane and ceiling plane in an installation space of the screen, and that the screen includes a distancing position changing mechanism which, bridging the space between the other one of the floor plane and ceiling plane and the second support, changes the distancing position of the second support from the first support.

Herein, as the distancing position changing mechanism, it is possible to exemplify with a configuration including the heretofore described restriction body and adjustment body, a configuration including a wire and a winding mechanism which winds the wire, or the like.

In the aspect of the invention, the screen includes the distancing position changing mechanism which, bridging the space between the floor plane or ceiling plane and the second support, changes the distancing position of the second support from the first support. By this means, by using the distancing position changing mechanism of a simple configuration, as well as it being possible to apply tension to the screen main body in an up-down direction, it is also possible to appropriately adjust the up-down direction tension applied to the screen main body. For this reason, it is possible to achieve a simplification in configuration of the screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereafter, a description will be given, based on the drawings, of a first embodiment of the invention.

Outline Configuration of Screen

Figure 1:
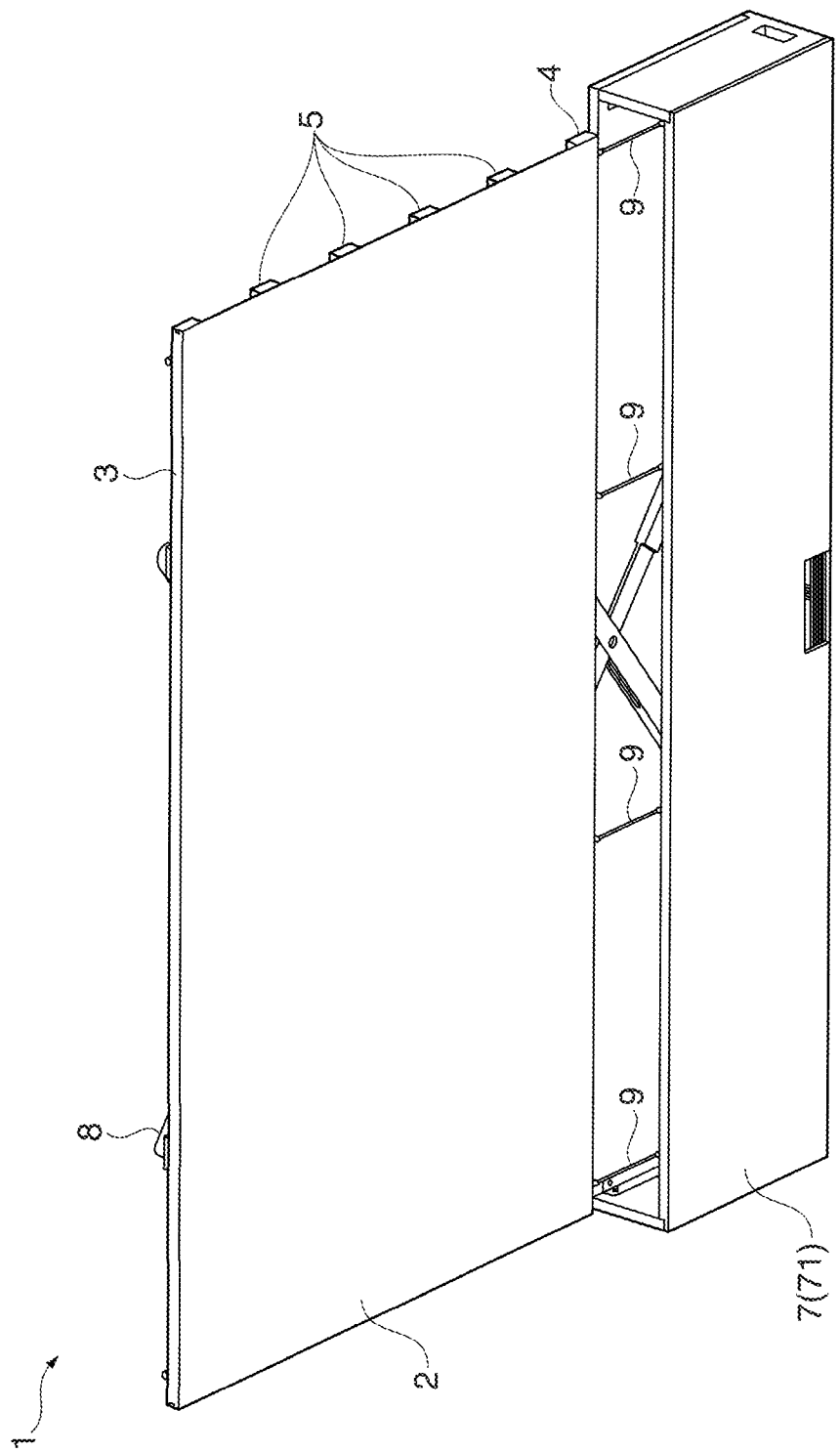
FIG. 1 schematically shows an outline configuration of a screen in a first embodiment.
Figure 2:
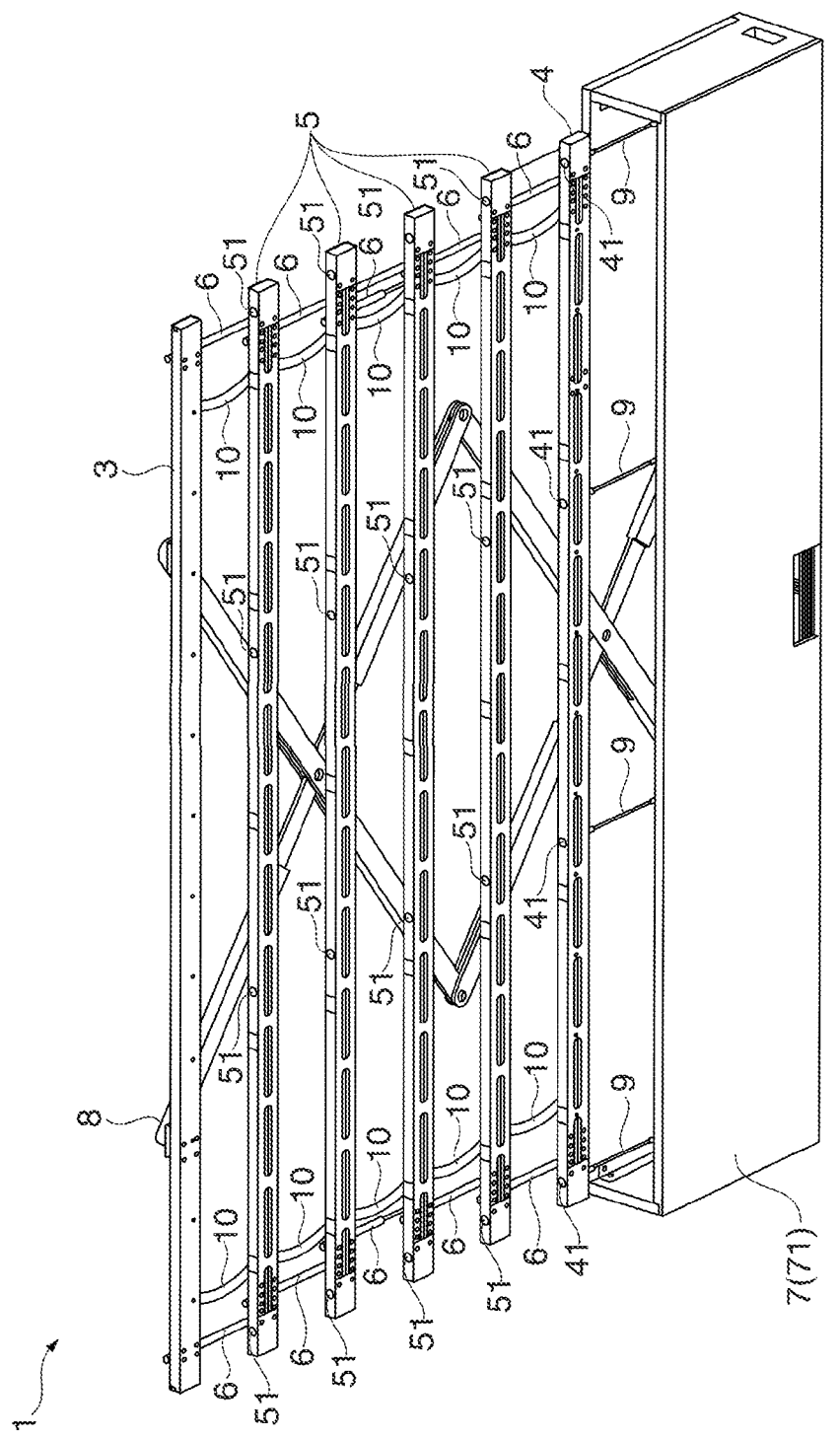
FIG. 2 schematically shows an outline configuration of the screen in the embodiment.
Figure 3:
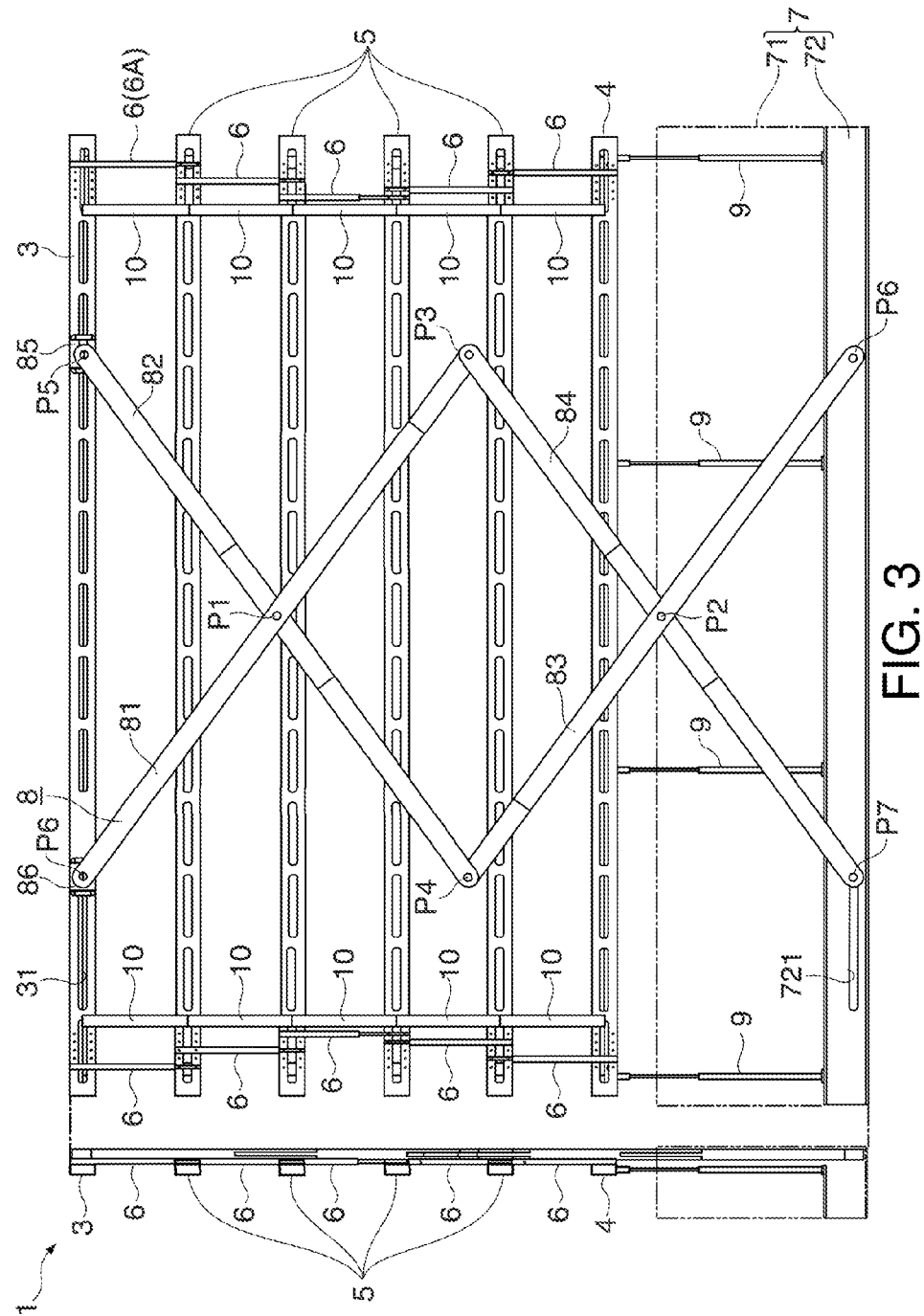
FIG. 3 schematically shows an outline configuration of the screen in the embodiment.

FIGS. 1 to 3 schematically show an outline configuration of a screen 1. Specifically, FIG. 1 is a perspective view of a condition in which a screen main body 2 and the like are taken out of a housing 7, and a projection surface is formed (a condition in which the screen main body 2 is flattened, which will hereafter be described as a stretched condition), as seen from the front side of the screen main body 2. FIG. 2 is a perspective view showing a condition in which the screen main body 2 is omitted in the condition of FIG. 1. FIG. 3 shows the condition of FIG. 2 as viewed from the rear side and a lateral side.

Hereafter, for the sake of description, in a condition in which the projection surface of the screen main body 2 is formed, the projection surface side will be described as a front, the side opposite to the projection surface as a rear, and the right and left viewed from the rear side as a right and a left respectively.

An image light projected magnified from, for example, a projector is projected onto the screen 1. As shown in FIGS. 1 to 3, the screen 1 includes the screen main body 2 (FIG. 1), a first support 3, a second support 4, auxiliary supports 5, linkage mechanisms 6 (FIGS. 2 and 3), the housing 7, a first support fixing mechanism 8, second support regulation mechanisms 9, and entanglement prevention mechanisms 10 (FIGS. 2 and 3).

Configuration of Screen Main Body

The screen main body 2 is formed into a sheet having flexibility, and an incident image light is projected onto the screen main body 2. In this embodiment, the screen main body 2 is configured as a reflective screen which reflects an incident image light.

Configuration of First Support

The first support 3, extending along the upper edge of the screen main body 2 having a rectangular shape, is configured of a hollow columnar body having a rectangular shape in cross-section. Then, the first support 3, to the front surface of which is attached a rear surface of the screen main body 2 at the upper edge, supports the upper edge of the screen main body 2.

As shown in FIG. 3, the first support 3 is configured so that a slot (rectangular hole) 31 extending in a left-right direction is formed on the left side of the rear surface.

Also, although a specific illustration is omitted, insertion holes passing through in an up-down direction are formed in the lower surface of the first support 3, one in each of four portions equally spaced in a left-right direction.

Configuration of Second Support

The second support 4, extending along the lower edge of the screen main body 2 having the rectangular shape, is configured of a hollow columnar body having a rectangular shape in cross-section. Then, the second support 4, to the front surface of which is attached a rear surface of the screen main body 2 at the lower edge, supports the lower edge of the screen main body 2.

In the second support 4, as shown in FIG. 2, insertion holes 41 passing through the upper and lower surfaces thereof are formed one in each of four portions which, corresponding to the insertion holes of the first support 3, are equally spaced in a left-right direction.

Configuration of Auxiliary Supports

The auxiliary supports 5, having the same shape as the second support 4, are configured of columnar bodies in each of which are formed insertion holes 51 (FIG. 2) corresponding to the insertion holes 41 and, in this embodiment, four auxiliary supports 5 are provided. Then, the auxiliary supports 5 are disposed in a condition in which the supports 3 to 5 are equally spaced between the first support 3 and the second support 4 in the stretched condition. Also, in a condition in which both left-right direction edges of the screen main body 2 are spread apart in a left-right direction, each auxiliary support 5, with both left-right direction edge rear surfaces of the screen main body 2 attached to both left-right direction edges of the front surface thereof, supports both left-right direction edges of the screen main body 2.

Configuration of Linkage Mechanisms

Figure 4:
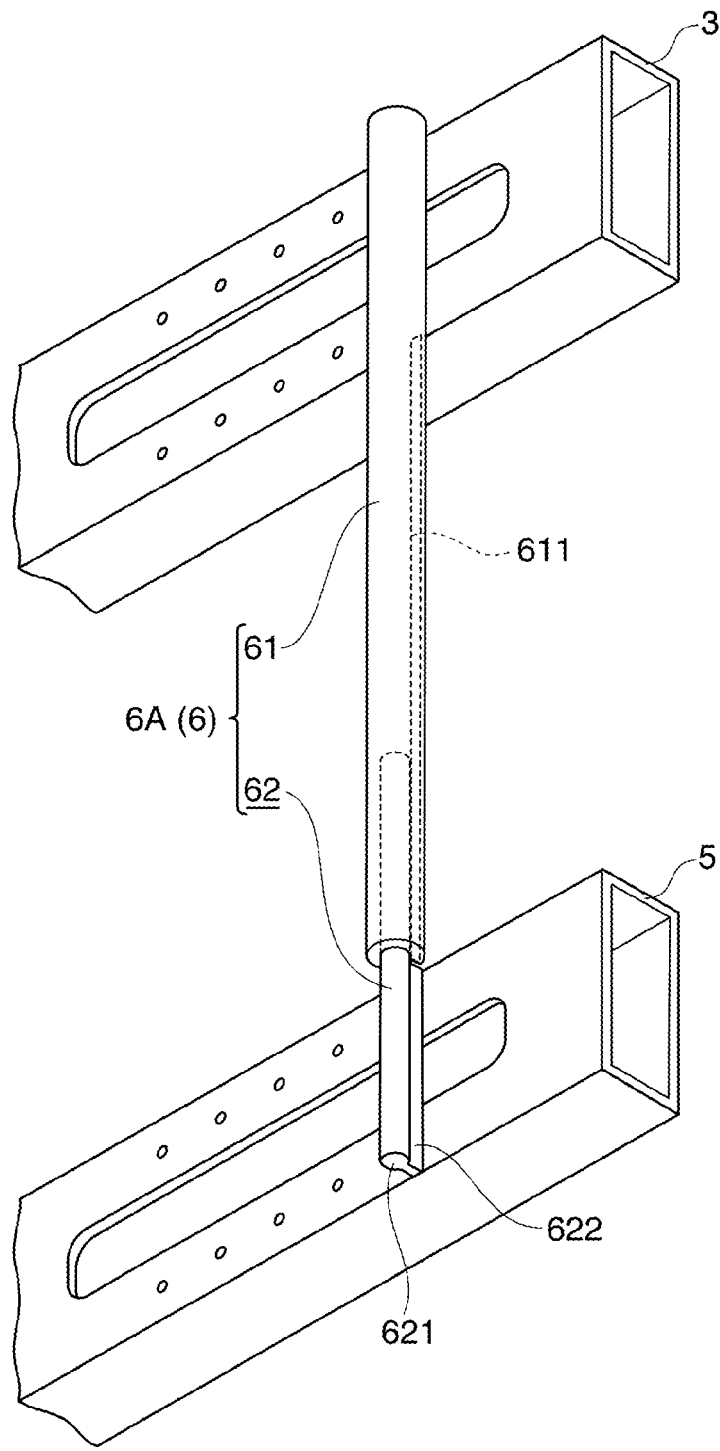
FIG. 4 illustrates a configuration of a linkage mechanism in the embodiment.

FIG. 4 illustrates a configuration of the linkage mechanisms 6. Specifically, FIG. 4 is a perspective view of a linkage mechanism 6A, among ten linkage mechanisms 6, disposed at the upper right shown in FIG. 3, as seen from below.

The linkage mechanisms 6 bridge adjacent supports 3 to 5. In this embodiment, ten linkage mechanisms 6 are provided, and disposed one on each of the left and right edge sides between adjacent supports 3 to 5.

As the linkage mechanisms 6 have the same configuration, only one linkage mechanism 6A will be described hereafter.

As shown in FIG. 4, the linkage mechanism 6A is configured of a tubular member 61 and an insertion member 62.

The tubular member 61, the upper end side of which is attached to the rear surface of the first support 3, is disposed in such a way as to extend downward.

The tubular member 61 is configured so that a slot 611 which, communicating between the interior and the exterior, extends from the upper end side to the lower end is formed on the front side.

The insertion member 62 includes a cylindrical portion 621 and a connection portion 622.

The cylindrical portion 621 is a portion which, extending in an up-down direction, is formed in a cylindrical shape having an outside diameter approximately identical to the inside diameter of the tubular member 61, and inserted into the tubular member 61.

The connection portion 622 is a portion which is formed on a front surface of the cylindrical portion 621 on the lower end side thereof, and connects the cylindrical portion 621 to the rear surface of the auxiliary support 5 adjacent to the first support 3.

By means of the heretofore described configuration, by the cylindrical portion 621 moving inside the tubular member 61 with a mechanical interference of the connection portion 622 with the tubular member 61 prevented by the slot 611, the linkage mechanisms 6 extend and contract in an up-down direction, bringing the supports 3 to 5 closer to and away from each other. Also, the linkage mechanisms 6, as each of them is in a condition in which the cylindrical portion 621 is inserted inside the tubular member 61, as well as regulating a movement of each support 3 to 5 in an out-of-plane direction of the projection surface of the screen main body 2, regulate a movement of each support 3 to 5 in a left-right direction.

Configuration of Housing

The housing 7 is a portion which supports the whole of the screen 1 installed on a floor plane and, when the screen 1 is not used, each member 2 to 6, and 8 to 10 is housed inside.

As shown in FIGS. 1 to 3, the housing 7 includes a housing main body 71 and a base plate 72 (FIG. 3).

The housing main body 71, being formed into an open-topped container, has an approximately rectangular shape as a whole.

The base plate 72, being formed into a rectangular plate, is fixed to the bottom portion of the housing main body 71. Then, the base plate 72 is configured so that the length of the long edge is set so as to be approximately identical to a length of the housing main body 71 inner portion in a left-right direction, while the length of the short edge is set so as to be smaller than a length of the housing main body 71 inner portion in a front-rear direction.

As shown in FIG. 3, the base plate 72 is configured so that a slot 721 extending in a left-right direction is formed on the left side of the rear surface, in approximately the same way as the slot 31 of the first support 3.

Configuration of First Support Fixing Mechanism

Figure 5:
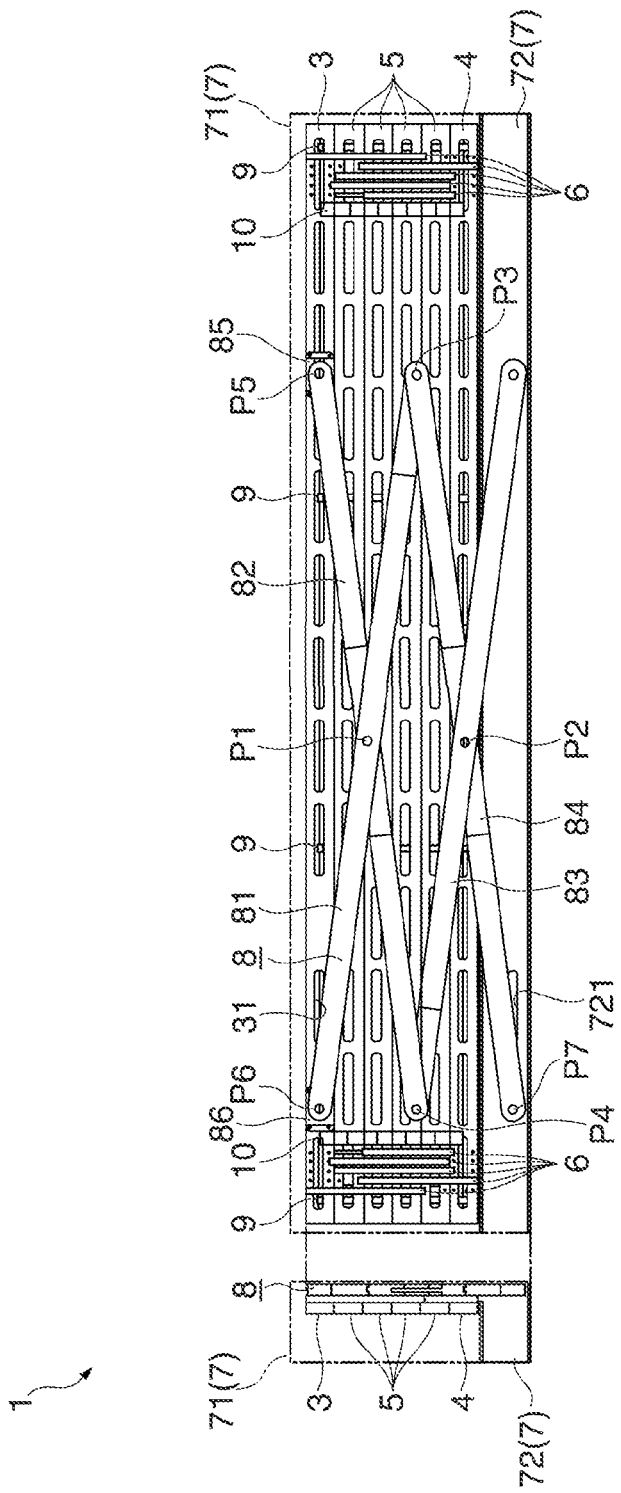
FIG. 5 illustrates a configuration of a first support fixing mechanism in the embodiment.

FIG. 5 illustrates a configuration of the first support fixing mechanism 8. Specifically, FIG. 5 shows a condition in which the members 2 to 6, and 8 to 10 are housed in the housing 7 from the condition of FIG. 3 (hereafter described as a housed condition).

As shown in FIG. 3 or 5, the first support fixing mechanism 8, having four arms 81 to 84 linked in such a way as to be bendable and extendable, is attached to extend over the base plate 72 and the first support 3, and configured of a pantograph mechanism which brings the base plate 72 and the first support 3 closer to and away from each other by the arms 81 to 84 bending and extending.

More specifically, the first support fixing mechanism 8 has the kind of linkage described hereafter.

As well as the first arm 81 and the second arm 82 being linked at a fulcrum P1 in such a way as to have an approximate X form, the third arm 83 and the fourth arm 84 are linked at a fulcrum P2 in such a way as to have an approximate X form.

Also, as well as the lower end of the first arm 81 and the upper end of the fourth arm 84 being linked at a fulcrum P3, the lower end of the second arm 82 and the upper end of the third arm 83 are linked at a fulcrum P4.

Then, as well as the upper end of the second arm 82 being linked at a fulcrum P5 to a fixed plate 85 fixed to the rear surface of the first support 3, the lower end of the third arm 83 is linked to the rear surface of the base plate 72 at a fulcrum P6.

Also, the upper end of the first arm 81 is linked at the fulcrum P6 to a sliding plate 86 slidably provided on the rear surface of the first support 3.

Herein, the sliding plate 86, being in engagement with the slot 31 of the first support 3, slides freely in a left-right direction along the slot 31.

In the same way, the lower end of the fourth arm 84 is linked to the rear surface of the base plate 72 at a fulcrum P7.

Herein, although a specific illustration is omitted, the fulcrum P7, being in engagement with a slot 721 of the base plate 72, slides freely in a left-right direction along the slot 721, together with the lower end of the fourth arm 84.

By means of the heretofore described configuration, by a user pulling the first support 3 upward from the housed condition shown in FIG. 5, the first support fixing mechanism 8 moves in conjunction, and extends while the sliding plate 86 and the fulcrum P7 are sliding to the right side along the slots 31 and 72. Also, as the supports 3 to 5 are connected by the screen main body 2, in response to the upward pulling of the first support 3, the auxiliary supports 5 and the second support 4 are pulled upward in order while the tubular members 61 and insertion members 62 of the linkage mechanisms 6 are changing their relative positions in an up-down direction. Then, when the first support fixing mechanism 8 is stretched, and the first support 3 is positioned in a predetermined height position (the condition of FIG. 3), the height position of the first support 3 is maintained by a friction between the sliding plate 86 and fulcrum P7, and the slots 31 and 721, and a friction between the arms 81 to 84, fixed plate 85 and sliding plate 86, and the fulcrums P1 to P7.

That is, the first support fixing mechanism 8 has a function of, when the first support 3 is taken out of the housing 7, is connected to the base plate 72 and the first support 3, fixing the distancing position (height position) of the first support 3 from the base plate 72.

By the user pulling the first support 3 downward with a predetermined amount of force from the stretched condition, the first support fixing mechanism 8 operates in reverse order to the heretofore described operation, setting the housed condition shown in FIG. 5.

Configuration of Second Support Regulation Mechanisms

Figure 6:
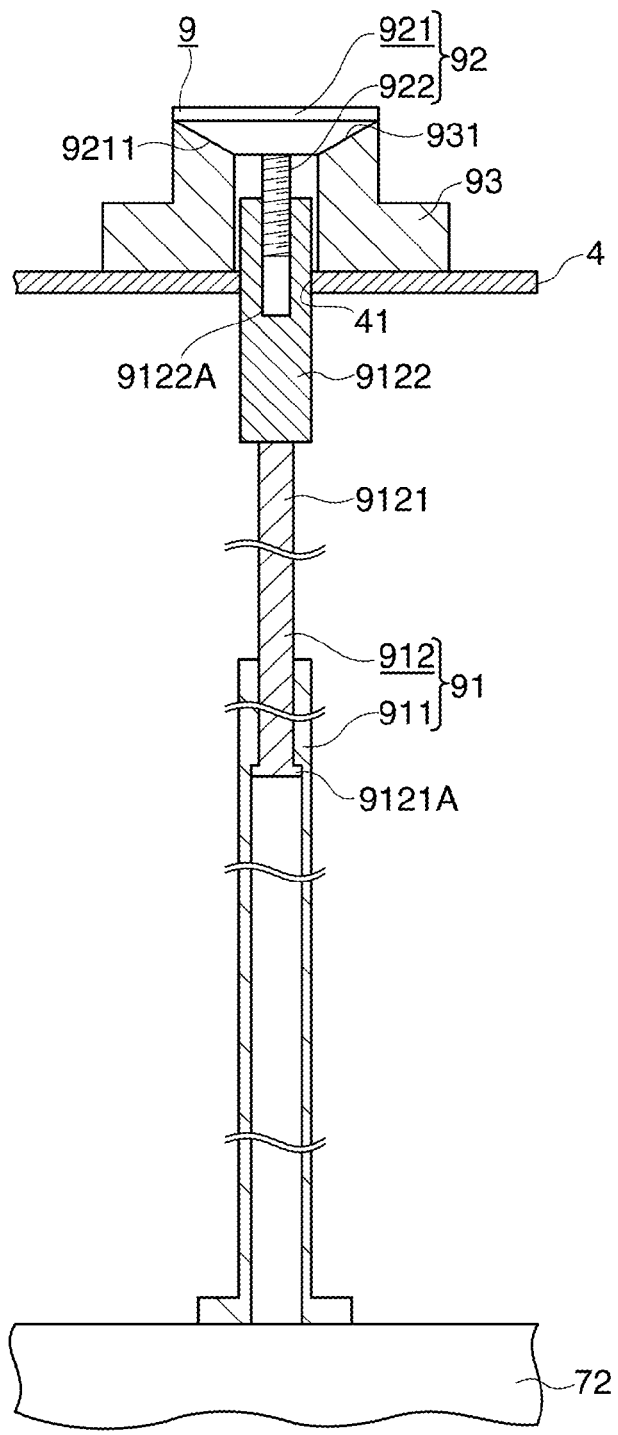
FIG. 6 illustrates a configuration of a second support regulation mechanism in the embodiment.

FIG. 6 illustrates a configuration of the second support regulation mechanisms 9.

The second support regulation mechanisms 9 bridge the second support 4 and the base plate 72. In this embodiment, four second support regulation mechanisms 9 are provided, and each disposed in positions of the supports 3 to 5 corresponding to the insertion holes 41 and 51.

As the second support regulation mechanisms 9 have the same configuration, only one second support regulation mechanism 9 will be described hereafter.

As shown in FIG. 6, the second support regulation mechanism 9 includes a restriction body 91, an adjustment body 92, and a reception member 93.

The restriction member 91, including a support member 911 and a movement member 912, is formed in a rod shape.

The support member 911 having a tubular form extending in an up-down direction, the lower end is fixed to the upper surface of the base plate 72.

The inner portion of the support member 911 is formed so as to have a step, the diameter above which is smaller than the diameter therebelow.

The movement member 912 includes a movement member main body 9121 and a threaded engagement portion 9122.

The movement member main body 9121 is a portion which, extending in an up-down direction, is formed in a cylindrical shape having an outside diameter approximately identical to the upper inside diameter of the support member 911, and inserted into the support member 911.

The movement member main body 9121 is configured so that an abutment portion 9121A of which the outside diameter is larger than that of the other portion is formed at the lower end. The abutment portion 9121A has an outside diameter approximately identical to the lower inside diameter of the support member 911.

The threaded engagement portion 9122, being attached to the upper end of the movement member main body 9121, connects the movement member main body 9121 and the adjustment body 92.

The threaded engagement portion 9122 is formed in a cylindrical shape extending in an up-down direction. Then, a threaded hole 9122A is inwardly bored in the upper end portion of the threaded engagement portion 9122.

The adjustment body 92, being disposed inside the second support 4 (between the upper and lower surfaces thereof), comes into threaded engagement with the threaded hole 9122A of the threaded engagement portion 9122 via the insertion hole 41 of the second support 4. The adjustment body 92 includes an adjustment knob 921 and a screw 922.

The adjustment knob 921 is a portion which, being formed into an approximate circular cone whose cross-sectional area decreases from the top downward, is rotationally operated by the user. A side surface 9211 of the circular cone of the adjustment knob 921 corresponds to a tapered surface according to some aspects of the invention.

The screw 922, being formed in such a way as to protrude downward from the vertex position of the circular cone of the adjustment knob 921, comes into threaded engagement with the threaded hole 9122A of the threaded engagement portion 9122.

The reception member 93 being formed in an approximately tubular shape surrounding the insertion hole 41 of the second support 4, the lower end is fixed to the lower surface of the second support 4.

The reception member 93 is configured so that a tapered surface 931 which, corresponding to the tapered surface 9211 of the adjustment knob 921, decreases in cross-sectional area from the top downward is formed in the upper end portion.

By means of the heretofore described configuration, when setting the stretched condition shown in FIG. 3, as shown in FIG. 6, as well as the tapered surface 9211 of the adjustment body 92 coming into abutment with the tapered surface 931 of the reception member 93, the movement member 912 moves to the upper termination position of the support member 911, and the abutment portion 9121A comes into abutment with the stepped portion inside the support member 911. Then, in the stretched condition shown in FIG. 3, an upward movement of the second support 4 is regulated by the second support regulation mechanism 9.

That is, the second support regulation mechanism 9 has a function of, when the first support 3 is taken out of the housing 7, being connected to the base plate 72 and the second support 4, regulating a movement of the second support 4 in a direction away from the base plate 72.

Also, in the stretched condition shown in FIG. 3, on the user rotationally operating the adjustment knob 921, changing a condition of threaded engagement of the adjustment body 92 and restriction body 91, the adjustment body 92 moves in an up-down direction, changing the distancing position (height position) of the second support 4 from the base plate 72. That is, by rotationally operating the adjustment knob 921, a distance between the first support 3 and the second support 4 is changed, changing the up-down direction tension of the screen main body 2.

Furthermore, in the case of setting the housed condition shown in FIG. 5 from the stretched condition shown in FIG. 3, the adjustment body 92 moves away from the reception member 93 and, as well as the restriction body 91 and the adjustment body 92 being inserted through the insertion hole 41 of the second support 4, the insertion hole 51 of each auxiliary support 5, and the insertion hole (not shown) of the first support 3, the movement member 912 moves downward into the support member 911, and the whole of the second support regulation mechanism 9 is housed in the housing 7.

Configuration of Entanglement Prevention Mechanisms

Figure 7:
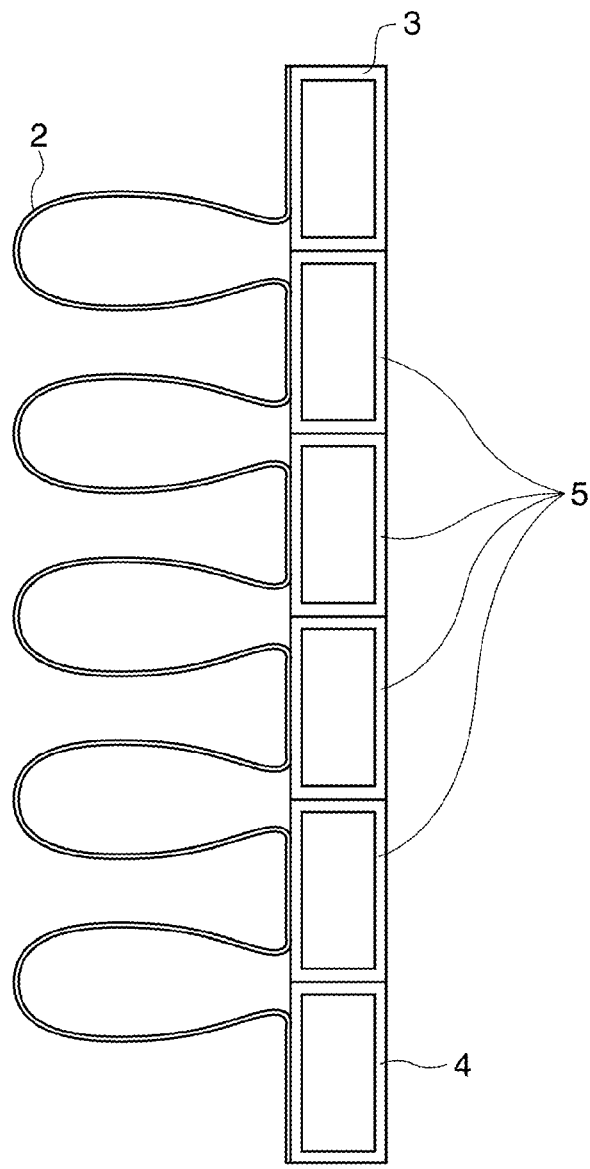
FIG. 7 illustrates a configuration of an entanglement prevention mechanism in the embodiment.
Figure 8A:
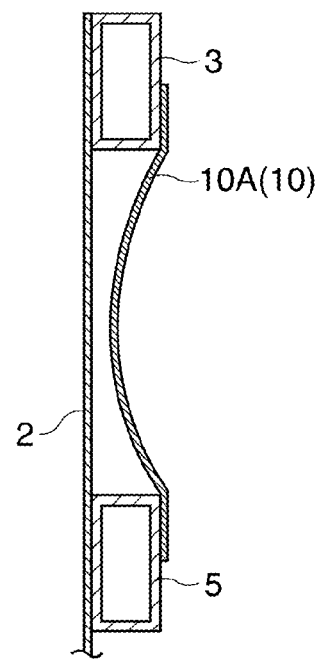
FIGS. 8A and 8B illustrate a configuration of the entanglement prevention mechanism in the embodiment.
Figure 8B:
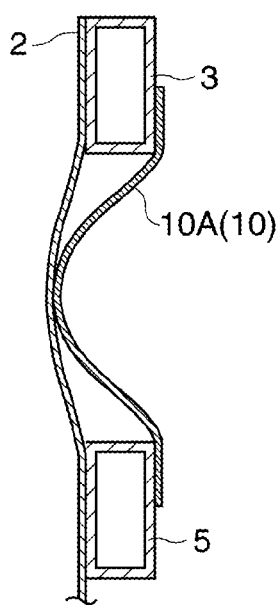

FIGS. 7, 8A, and 8B illustrate a configuration of the entanglement prevention mechanisms 10. Specifically, FIG. 7 shows a condition of the screen main body 2 and supports 3 to 5 when setting the housed condition shown in FIG. 5, as viewed from the left side. FIGS. 8A and 8B are sectional views of an operation of the entanglement prevention mechanisms 10, as seen from the left side. Also, FIG. 8A shows a condition of the entanglement prevention mechanisms 10 when setting the stretched condition shown in FIG. 3, and FIG. 8B shows a condition of the entanglement prevention mechanisms 10 when pulling the first support 3 downward from the condition of FIG. 8A. In FIGS. 8A and 8B, an entanglement prevention mechanism 10A, among ten entanglement prevention mechanisms 10, disposed at the upper right shown in FIG. 3 is shown.

On setting the housed condition shown in FIG. 5, as shown in FIG. 7, a condition is attained in which adjacent supports 3 to 5 are in abutment with each other. Then, portions of the screen main body 2 which are not connected to the supports 3 to 5 bend to the front side, and the screen main body 2 is set so as to have an accordion form as a whole.

The entanglement prevention mechanisms 10, when setting the housed condition shown in FIG. 5, prevent the portions of the screen main body 2 which are not connected to the supports 3 to 5 from being caught between the supports 3 to 5.

The entanglement prevention mechanisms 10 bridge adjacent supports 3 to 5. In this embodiment, ten entanglement prevention mechanisms 10 are provided, and disposed on both left and right end sides between adjacent supports 3 to 5.

As the entanglement prevention mechanisms 10 have the same configuration, only one entanglement prevention mechanism 10A will be described hereafter.

As shown in FIGS. 8A and 8B, the entanglement prevention mechanism 10A is configured of a flexible member having a predetermined amount of elasticity. In this embodiment, the entanglement prevention mechanism 10A employs polyethylene terephthalate (PET) having a thickness of, for example, 0.25 mm. Then, as shown in FIG. 8A, the entanglement prevention mechanism 10A bridges adjacent supports 3 to 5 in a condition in which an approximately central portion thereof in an up-down direction is caused to tend to bend to the front side in advance.

On the supports 3 and 5 moving closer to each other, as shown in FIG. 8B, the approximately central portion of the entanglement prevention mechanism 10A in an up-down direction bends to the front side, pressing the portion of the screen main body 2, which is not connected to each support 3 and 5, to the front side.

On the housed condition shown in FIG. 5 being set by the entanglement prevention mechanisms 10 operating in the way heretofore described, as shown in FIG. 7, the screen main body 2 is set so as to have an accordion form as a whole.

In the first embodiment heretofore described, there are the following advantages.

In this embodiment, the screen 1 includes the auxiliary supports 5 and the linkage mechanisms 6, apart from the screen main body 2, the first support 3, and the second support 4.

Then, each linkage mechanism 6, being configured of the tubular member 61 and the insertion member 62, extends and contracts in an up-down direction, bringing the supports 3 to 5 closer to and away from each other. By this means, by bringing the first support 3 and the second support 4 a predetermined distance away from each other by means of the linkage mechanisms 6, as well as the stretched condition being set, it is possible to apply tension to the screen main body 2 in an up-down direction.

Also, the auxiliary supports 5 support both left-right direction edges of the screen main body 2. By this means, in the event of causing the auxiliary supports 5 to support both left-right direction edges in a condition in which tension is applied to the screen main body 2 in a left-right direction, it is possible, in the stretched condition too, to efficiently maintain the left-right direction tension applied to the screen main body 2 by means of the auxiliary supports 5.

Furthermore, the linkage mechanisms 6 regulate a movement of each support 3 to 5 in an out-of-plane direction of the projection surface, and a movement of each support 3 to 5 in a left-right direction. By this means, in the screen main body 2, as well as it being possible to efficiently maintain a position thereof supported by the supports 3 to 5 against a movement in an out-of-plane direction of the projection surface, it is possible to prevent a distortion of the screen main body 2.

As heretofore described, as tension is applied to the screen main body 2 in an up-down direction and a left-right direction while suppressing a flapping of each support 3 to 5 in an out-of-plane direction of the projection surface, and a distortion of the screen main body 2, by means of the linkage mechanisms 6, it is possible, in the stretched condition, to effectively prevent a deflection and undulation of the screen main body 2, efficiently maintaining the flatness of the projection surface.

Also, as the screen 1 includes the housing 7 configured of the housing main body 71 and the base plate 72, the screen 1, when not used, attaining a condition in which the screen main body 2 and the like are housed inside the housing 7, as well as it being possible to make the external appearance favorable, it is possible to easily carry the screen 1.

Furthermore, the screen 1 includes the first support fixing mechanism 8 which is connected to the base plate 72 and the first support 3, fixing the height position of the first support 3 from the base plate 72. By this means, for example, when setting the stretched condition, it not being necessary to fix the first support 3 to a ceiling plane using a wire or the like, it is possible to easily implement the setting of the stretched condition.

Also, as the screen 1 includes the second support regulation mechanisms 9, it is possible, in the stretched condition, to regulate an upward movement of the second support 4 by means of the second support regulation mechanisms 9. That is, in the stretched condition, by positioning the second support 4 in a predetermined distancing position thereof from the base plate 72 by means of the second support regulation mechanisms 9, it is possible to bring the first support 3 and the second support 4 a predetermined distance away from each other, and apply a desired amount of tension to the screen main body 2 in an up-down direction.

Furthermore, as the second support regulation mechanisms 9 are configured in such a way as to be able to change the distancing position of the second support 4 from the base plate 72, it is possible, in the stretched condition, to change the distancing position of the second support 4 from the base plate 72, that is, a distance between the first support 3 and the second support 4, appropriately adjusting the up-down direction tension applied to the screen main body 2.

Also, as each second support regulation mechanism 9 includes the restriction body 91 and the adjustment body 92, while making the second support regulation mechanisms 9 a simple structure, it is possible, in the stretched condition, to easily implement a regulation of the upward movement of the second support 4, and a change of the distancing position of the second support 4 from the base plate 72, by means of the second support regulation mechanisms 9.

Furthermore, in the stretched condition, the adjustment body 92 comes into abutment with the reception member 93 fixed to the peripheral portion of the insertion hole 41. Then, the adjustment body 92 and the reception member 93 respectively have the tapered surfaces 9211 and 931 which come into abutment with the other of each. By this means, even in the event that a looseness occurs between the support member 911 and the movement member 912 which configure the restriction body 91, it being possible, in the stretched condition, to put the restriction body 91 into a condition in which it is oriented in an up-down direction without being tilted when the adjustment body 92 and the reception member 93 come into abutment with each other, it is possible to only apply force downward to the second support 4. That is, it not happening that the second support 4 is displaced in a left-right direction, it is possible to efficiently maintain the flatness of the screen main body 2.

Also, as the screen 1 includes the entanglement prevention mechanisms 10, on the supports 3 to 5 moving closer to each other from the stretched condition, the entanglement prevention mechanisms 10 bend to the screen main body 2 side, enabling the entanglement prevention mechanisms 10 to press the screen main body 2 to the front side. For this reason, in the housed condition, it being possible to prevent the screen main body 2 from being caught between the supports 3 to 5, it is possible to prevent rumples or the like from occurring in the screen main body 2.

Second Embodiment

Next, a description will be given, based on the drawings, of a second embodiment of the invention.

In the following description, structures similar, and members identical, to those of the first embodiment being indicated by identical reference characters, a detailed description thereof will be omitted or simplified.

Figure 9:
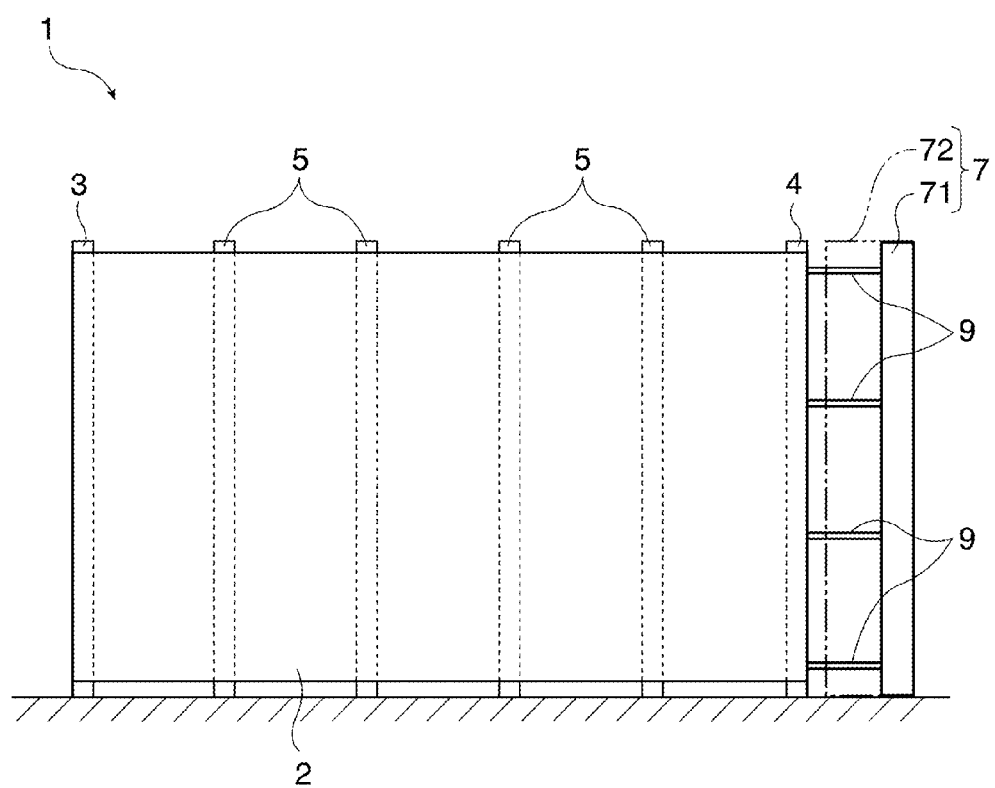
FIG. 9 schematically shows an outline configuration of a screen in a second embodiment.

FIG. 9 schematically shows an outline configuration of a screen 1 of the second embodiment. Specifically, FIG. 9 shows the stretched condition as viewed from the front side of the screen main body 2.

This embodiment only differs from the first embodiment in that the first support 3 is horizontally pulled from the housing 7, setting the stretched condition, as shown in FIG. 9. For this reason, the screen 1 of this embodiment has approximately the same configuration as the screen 1 described in the first embodiment.

In FIG. 9, for the sake of description, as components of the screen 1, only the screen main body 2, supports 3 to 5, housing 7, and second support regulation mechanisms 9 are illustrated, and an illustration of other members 6, 8 and 10 is omitted.

Specifically, the housing 7 is vertically installed on the floor plane, as shown in FIG. 9.

Herein, although a specific illustration is omitted, the housing main body 71 is configured so that a notch through which the lower ends of the supports 3 to 5 can be inserted toward the base plate 72 from the opening portion of the housing main body 71 is formed in a surface which comes into abutment with the floor plane.

Figure 10:
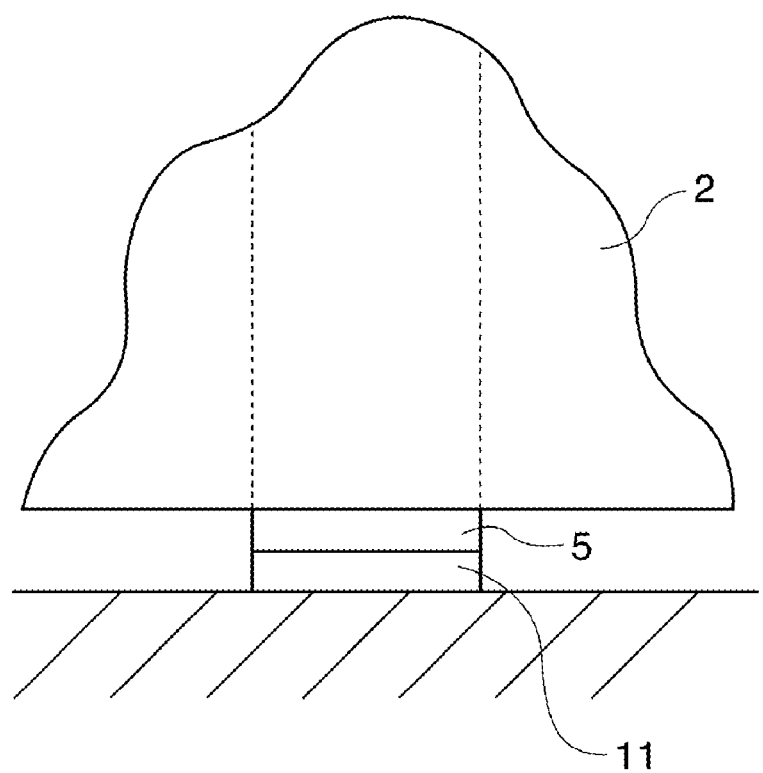
FIG. 10 shows a configuration of the lower end of each support in this embodiment.

FIG. 10 shows a configuration of the lower end of each auxiliary support 5.

Also, as shown in FIG. 9, the lower end of each support 3 to 5 comes into abutment with the floor plane. That is, when setting the stretched condition or the housed condition, each support 3 to 5 slides on the floor plane.

Then, as shown in FIG. 10, a slide 11 which, being configured of a low friction material such as fluorine resin, slides on the floor plane is attached to the lower end of each auxiliary support 5.

Although a specific illustration is omitted, the same slide 11 is attached to the lower end of each support 3 and 4 too, apart from each auxiliary support 5.

According to the second embodiment heretofore described, apart from the same advantages as those of the first embodiment, there is the following advantage.

In this embodiment, the first support 3 and the second support 4 support both left-right direction edges of the screen main body 2. Then, the lower end of each support 3 to 5 comes into abutment with the floor plane in a condition in which the screen 1 is installed on the floor plane. By this means, it being possible to prevent the self-weight of the supports 3 to 5, linkage mechanisms 6, and the like, from being applied to the screen main body 2, it is possible to make flatness uniform all over the screen main body 2.

Third Embodiment

Next, a description will be given, based on the drawings, of a third embodiment of the invention.

In the following description, structures similar, and members identical, to those of the first embodiment being indicated by identical reference characters, a detailed description thereof will be omitted or simplified.

Figure 11A:
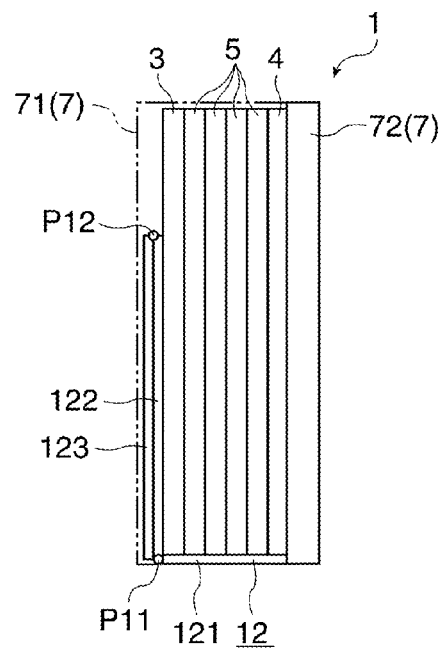
FIGS. 11A and 11B schematically show an outline configuration of a screen in a third embodiment.
Figure 11B:
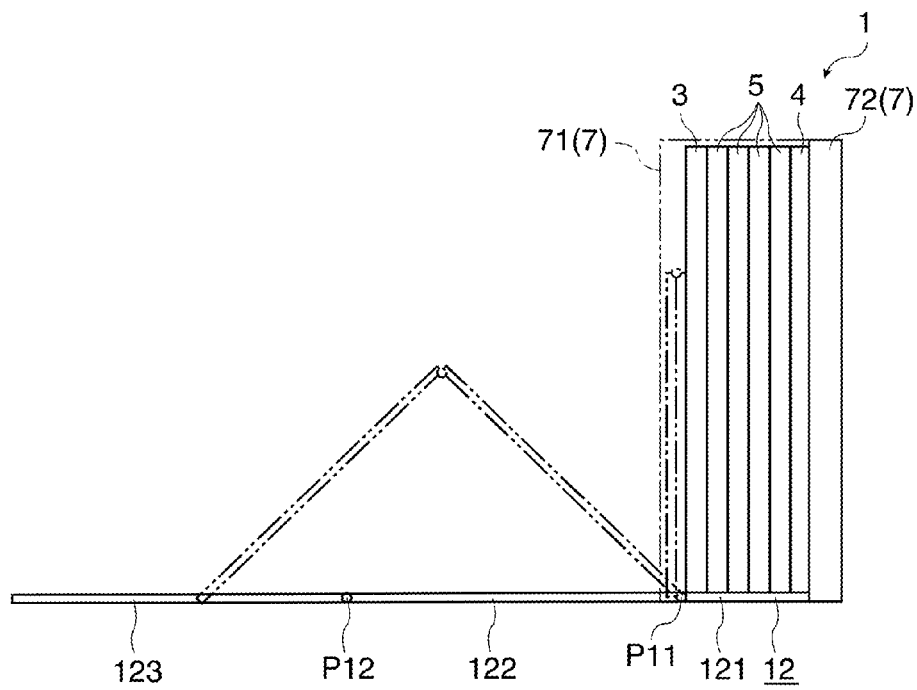

FIGS. 11A and 11B schematically show an outline configuration of a screen 1 of the third embodiment. Specifically, FIG. 11A shows the housed condition. FIG. 11B illustrates an operation of taking out the screen main body 2 and the like from the housing 7.

This embodiment only differs from the second embodiment in that, the screen 1 including a rail member 12, a configuration is such that the lower end of each support 3 to 5 slides on the rail member 12 when the first support 3 is horizontally pulled from the housing 7, or when a reversal operation is implemented.

In FIGS. 11A and 11B, for the sake of description, as components of the screen 1, only the supports 3 to 5 and housing 7 are illustrated, and an illustration of other members 2, 6, and 8 to 10 is omitted.

Specifically, as shown in FIGS. 11A and 11B, the rail member 12 is configured of a first rail 121, a second rail 122, and a third rail 123 which are linked to each other.

One end of the first rail 121 is fixed to the upper surface of the base plate 72, and the other end extends to the vicinity of the opening portion of the housing main body 71. Also, the first rail 121 is exposed to the exterior via the notch (not shown) of the housing main body 71 which is formed toward the base plate 72 from the opening portion. Then, the first rail 121 comes into abutment with the floor plane when the housing 7 is vertically installed on the floor plane.

One end of the second rail 122 is linked to the other end of the first rail 121 via a fulcrum P11. Then, the second rail 122 is configured so as to be pivotable around the P11 in such a way as to come approximately into line with the first rail 121, and become approximately perpendicular to the first rail 121 by the other end moving upward.

One end of the third rail 123 is linked to the other end of the second rail 122 via a fulcrum P12. Then, the third rail 123 is configured so as to be pivotable around the fulcrum P12 in such a way as to come approximately into line with the second rail 122, and come into abutment with one end of the second rail 122 by the other end moving downward.

Each rail 121 to 123 heretofore described comes into engagement with the lower end of each support 3 to 5, allowing each support 3 to 5 to slide freely in a horizontal direction.

When setting the housed condition, as shown in FIG. 11A, as well as the second rail 122 being pivoted around the fulcrum P11 in such a way as to become perpendicular to the first rail 121, the third rail 123 is pivoted around the fulcrum 12 in such a way as to bring the other end of the third rail 123 into abutment with one end of the second rail 122. In this condition, apart from each member 2 to 6, and 8 to 10, the rail member 12 is also housed inside the housing 7.

Also, when setting the stretched condition, as shown in FIG. 11B, the rail member 12 is pulled from the housing 7 via each fulcrum P11 and P12 in such a way that each rail 121 to 123 comes into line. Then, each support 3 to 5 is caused to slide along the rail member 12.

According to the third embodiment heretofore described, apart from the same advantages as those of the second embodiment, there is the following advantage.

In this embodiment, as each support 3 to 5 slides on the rail member 12, it is possible to easily set the stretched condition or the housed condition.

Fourth Embodiment

Next, a description will be given, based on the drawings, of a fourth embodiment of the invention.

In the following description, structures similar, and members identical, to those of the first embodiment being indicated by identical reference characters, a detailed description thereof will be omitted or simplified.

Figure 12:
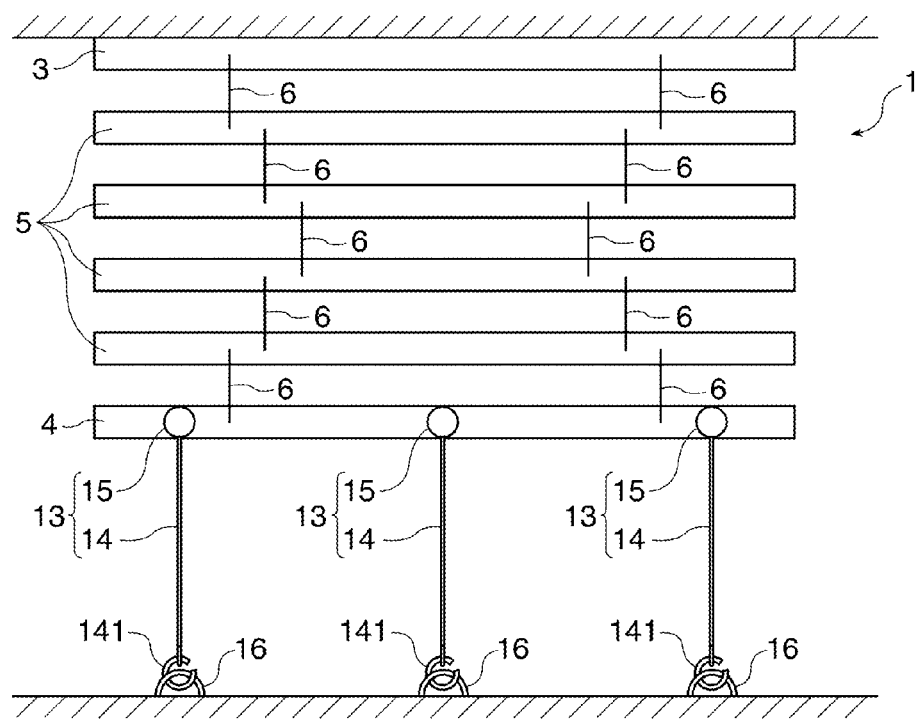
FIG. 12 schematically shows an outline configuration of a screen in a fourth embodiment.

FIG. 12 schematically shows an outline configuration of a screen 1 of the fourth embodiment. Specifically, FIG. 12 shows the stretched condition as viewed from the rear side of the screen 1.

This embodiment only differs from the first embodiment in that, as well as the housing 7, the first support fixing mechanisms 8, and the second support regulation mechanisms 9 being omitted, the screen 1 includes distancing position changing mechanisms 13. Other components are the same as those of the first embodiment.

In FIG. 12, for the sake of description, as components of the screen 1, only the screen main body 2, supports 3 to 5, linkage mechanisms 6, and distancing position changing mechanisms 13 are illustrated, and an illustration of other members 2 and 10 is omitted.

Specifically, as shown in FIG. 12, the first support 3 is fixed to the ceiling plane.

The distancing position changing mechanisms 13, when setting the stretched condition, bridge the second support 4 and the floor plane, and the second support 4 is pulled downward, applying up-down direction tension to the screen main body 2. In this embodiment, three distancing position changing mechanisms 13 are provided, and attached one to each of three portions of the second support 4 rear surface which are equally spaced in a left-right direction.

As the distancing position changing mechanisms 13 have the same configuration, only one distancing position changing mechanism 13 will be described hereafter.

As shown in FIG. 12, the distancing position changing mechanism 13 includes a wire 14 and a winding mechanism 15.

A C-shaped hook 141 is attached to one end of the wire 14.

Figures 13A, 13B:
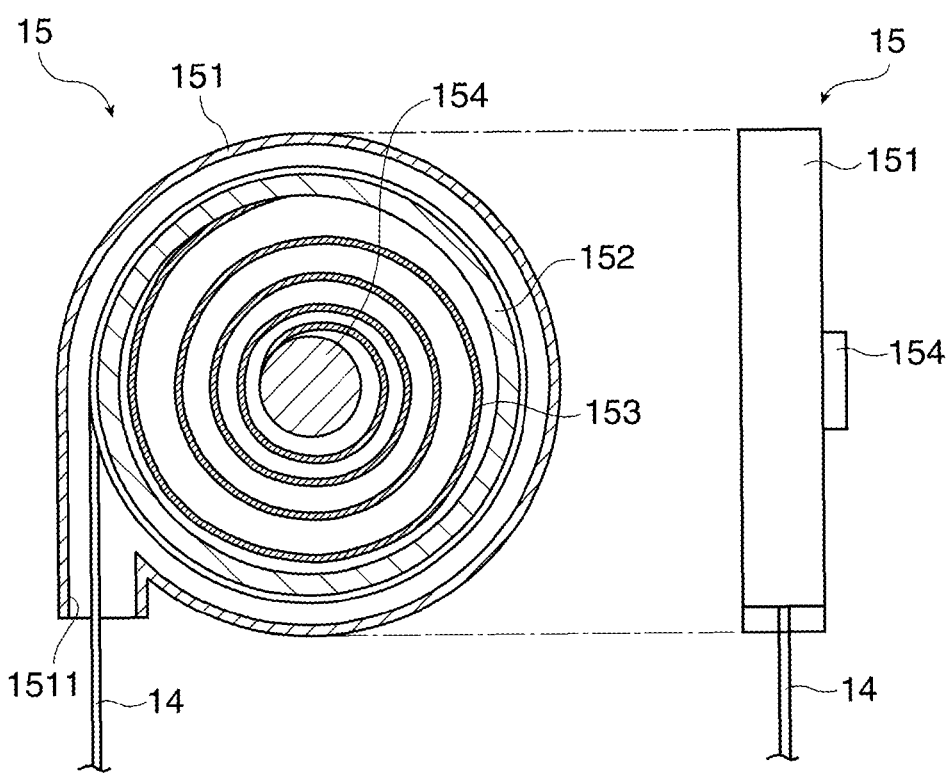
FIGS. 13A and 13B illustrate a configuration of a winding mechanism in this embodiment.

FIGS. 13A and 13B show a configuration of the winding mechanism 15.

As shown in FIG. 12, the winding mechanism 15, being fixed to the rear surface of the second support 4, is configured in such a way as to be able to wind the wire 14.

As shown in FIGS. 13A and 13B, the winding mechanism 15 includes a casing 151, a drum 152, a spring 153, and an adjustment shaft 154.

The casing 151 being an approximately cylindrical casing, a bottom surface portion is fixed to the rear surface of the second support 4.

The casing 151 is configured so that a communicating hole 1511 communicating between the interior and the exterior is formed on the lower side of the cylindrical side surface.

The drum 152, being rotatably housed inside the casing 151, winds the other end of the wire 14 inserted inside the casing 151 via the communicating hole 1511.

The spring 153 being disposed inside the drum 152, one end is fixed to the inner peripheral surface of the drum 152, and the other end is fixed to the adjustment shaft 154. Then, the spring 153 biases the drum 152 in a rotating direction thereof (a direction in which the wire 14 is wound; a clockwise direction in FIG. 13A).

The adjustment shaft 154 being attached to the casing 151 in such a way as to be positioned in the approximate center of the drum 152, one portion protrudes to the exterior of the casing 151. Then, the adjustment shaft 154, being made rotatable in a rotating direction of the drum 152 relative to the casing 151, is rotationally operated by the user, thereby changing a biasing condition of the spring 153.

By means of the heretofore described configuration, when setting the stretched condition, as the drum 152 is biased in a direction in which the wire 14 is wound by the spring 153 by the hook 141 attached to the one end of the wire 14 being hooked on a hook engagement portion 16 (FIG. 12) attached to the floor plane, force is applied downward to the second support 4 via the wire 14. That is, the distancing position changing mechanism 13 applies up-down direction tension to the screen main body 2.

Also, by the user rotationally operating the adjustment shaft 154, a biasing condition of the spring 153 is changed, changing the up-down direction tension of the screen main body 2. For example, in FIG. 13A, in the event that the user rotationally operates the adjustment shaft 154 clockwise, the force for the spring 153 to bias the drum 152 in a direction in which the wire 14 is wound is increased, that is, the up-down direction tension of the screen main body 2 is increased.

According to the fourth embodiment heretofore described, apart from the advantages of the first embodiment, there is the following advantage.

In this embodiment, the screen 1 includes the distancing position changing mechanisms 13 which, bridging the floor plane and the second support 4, change the distancing position of the second support 4 from the first support 3. By this means, by using the distancing position changing mechanisms 13 of a simple configuration, each of which is configured of the wire 14 and the winding mechanism 15, as well as it being possible to apply tension to the screen main body 2 in an up-down direction, it is also possible to appropriately adjust the up-down direction tension applied to the screen main body 2. Also, as it is possible to omit the first support fixing mechanisms 8, it is possible to achieve a simplification in configuration of the screen 1.

Fifth Embodiment

Next, a description will be given, based on the drawings, of a fifth embodiment of the invention.

In the following description, structures similar, and members identical, to those of the first embodiment being indicated by identical reference characters, a detailed description thereof will be omitted or simplified.

Figure 14:
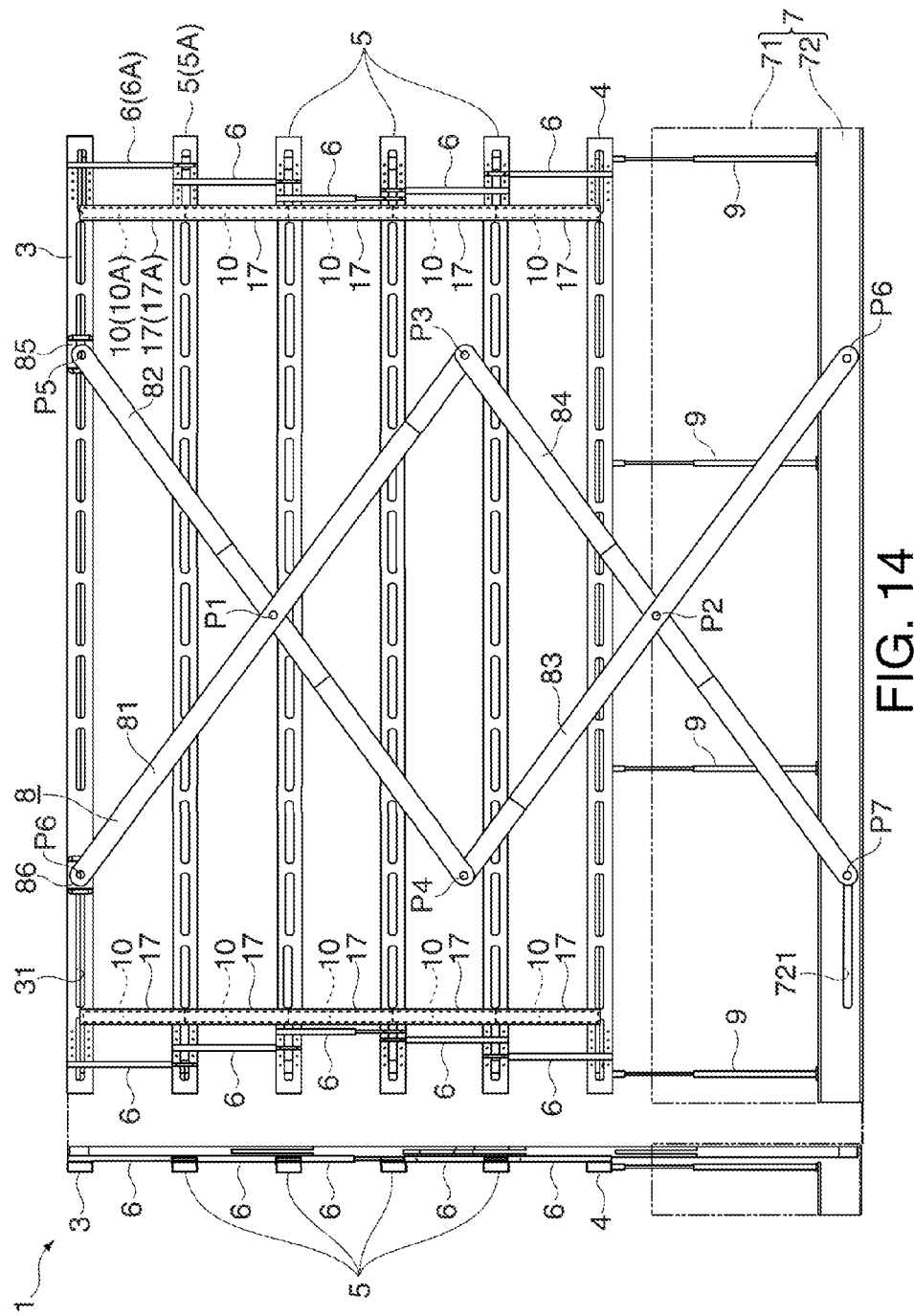
FIG. 14 schematically shows an outline configuration of a screen in a fifth embodiment.

FIG. 14 schematically shows an outline configuration of a screen 1 of the fifth embodiment. Specifically, FIG. 14 is a rear view showing a condition in which the screen main body 2 is omitted.

As shown in FIG. 14, this embodiment differs from the first embodiment in that the screen 1 includes regulation members 17, and other components are the same as those of the first embodiment.

The regulation members 17, bridging in such a way as to cover the entanglement prevention mechanisms 10 on the rear surface side of each support 3 to 5, are configured of flexible members. In this embodiment, the regulation members 17 employ a material configuring the screen main body 2. Ten regulation members 17 are provided between adjacent supports 3 to 5, and disposed on both left and right edge sides between adjacent supports 3 to 5. The material of the regulation members 17 not being limited to the material configuring the screen main body 2, it is sufficient as long as a material has flexibility.

Figure 15A:
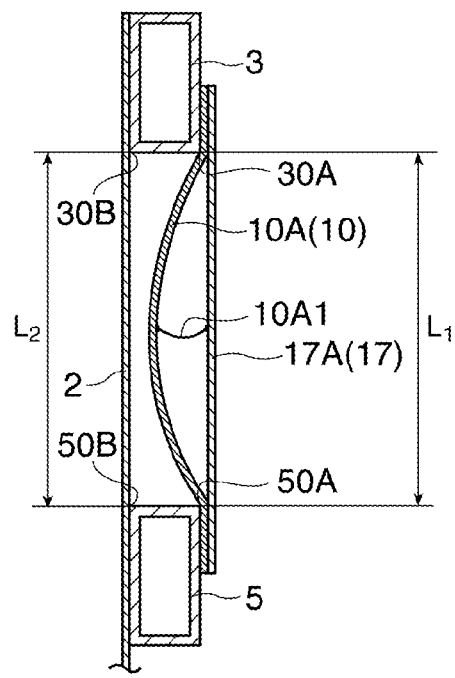
FIGS. 15A and 15B illustrate a configuration of a regulation member in this embodiment.
Figure 15B:
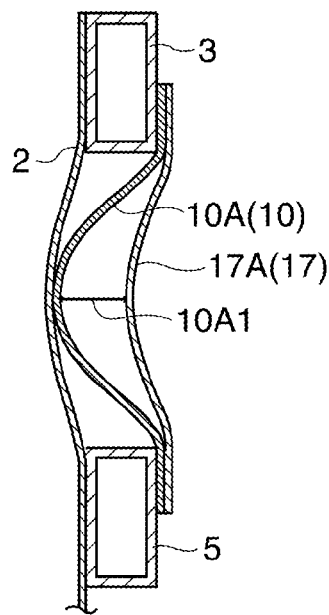

FIGS. 15A and 15B illustrate a configuration of a regulation member 17A and, specifically, are side views of the regulation member 17A, as seen from a side. FIG. 15A shows the regulation member 17A when setting the stretched condition shown in FIG. 3, and FIG. 15B shows a condition of the regulation member 17A in a condition in which the first support 3 is pulled downward from the condition of FIG. 15A. In FIGS. 15A and 15B, the regulation member 17A, among the ten regulation members 17, disposed at the upper right shown in FIG. 3 (the regulation member bridging the first support 3 and the auxiliary support 5) is shown.

As shown in FIGS. 15A and 15B, the regulation member 17A is connected to mutually opposed rear corners 30A and 50A on the rear surface sides of the respective supports 3 and 5 formed in identical, approximately rectangular shapes in cross-section, in such a way as to cover the entanglement prevention mechanism 10. In this embodiment, in the stretched condition, a rear corner-to-corner dimension $L_1$ between the rear corners 30A and 50A is set so as to be approximately identical to a front corner-to-corner dimension $L_2$ between mutually opposed front corners 30B and 50B on the front surface sides of the respective supports 3 and 5. Also, as shown in FIG. 15A, approximately central portions of the regulation member 17 and entanglement prevention mechanism 10 in an up-down direction are connected by a string-like body 10A1. According to this, in the case in which the supports 3 to 5 move closer to each other, as shown in FIG. 15B, the approximately central portion of the entanglement prevention mechanism 10 in an up-down direction bends to the front side and, in response to the bending of the entanglement prevention mechanism 10, the string-like body 10A1 pulls a portion of each regulation member 17 which is not connected to each support 3 to 5 to the front side.

Figure 16A:
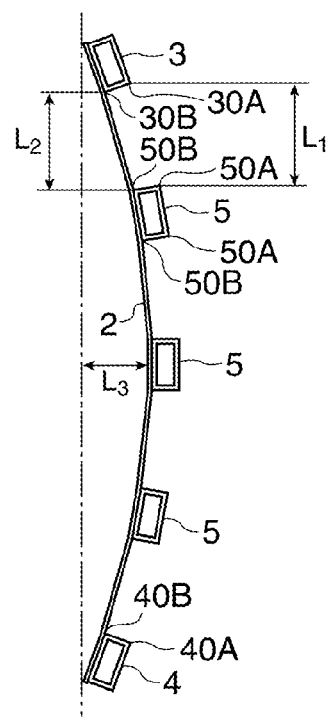
FIGS. 16A and 16B illustrate an advantage of this embodiment.
Figure 16B:
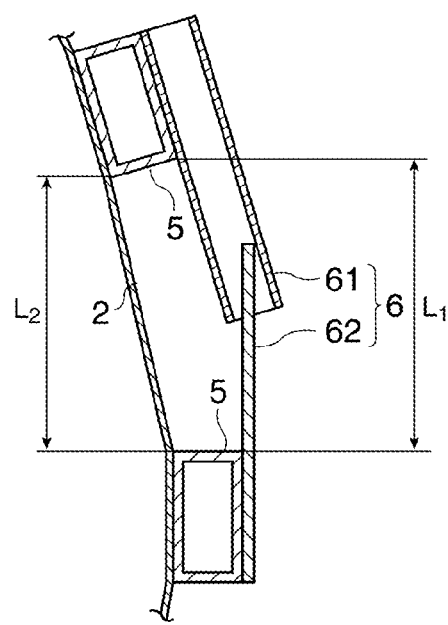

FIGS. 16A and 16B illustrate an advantage of this embodiment. More specifically, FIG. 16A schematically shows the stretched condition in the first embodiment (in the case in which no regulation member 17 is provided), and FIG. 16B schematically shows the linkage mechanism 6 in the condition of FIG. 16A. In FIG. 16A, an illustration is given with the linkage mechanism 6 omitted.

According to the fifth embodiment heretofore described, apart from the advantages of the first embodiment, there is the following advantage.

Herein, in the case in which no regulation member 17 is provided in the screen main body 2, as shown in FIGS. 16A and 16B, when tension is applied in an up-down direction of the screen main body 2, as shown in FIG. 16B, there is a fear of the rear corner-to-corner dimension $L_1$ becoming larger than the front corner-to-corner dimension $L_2$ because of the structure of the linkage mechanism 6. That is, as shown in FIG. 16A, the rear corner-to-corner dimension $L_1$ between the rear corners 30A, 40A, and 50A becomes larger than the front corner-to-corner dimension $L_2$, and the screen main body 2 is curved toward the rear surface side of the screen main body 2, reducing the flatness of the projection surface of the screen main body 2.

In this embodiment, as heretofore described, on the rear surface sides of the supports 3 to 5, the regulation members 17 bridge adjacent supports 3 to 5. With the regulation members 17, by this means, it being possible to maintain the rear corner-to-corner dimension $L_1$ and the front corner-to-corner dimension $L_2$ approximately identical, it is possible to prevent the screen main body 2 from being curved to the rear side. Consequently, it is possible to prevent a reduction in flatness of the projection surface of the screen main body 2.

Sixth Embodiment

Next, a description will be given, based on the drawings, of a sixth embodiment of the invention.

Figure 17:
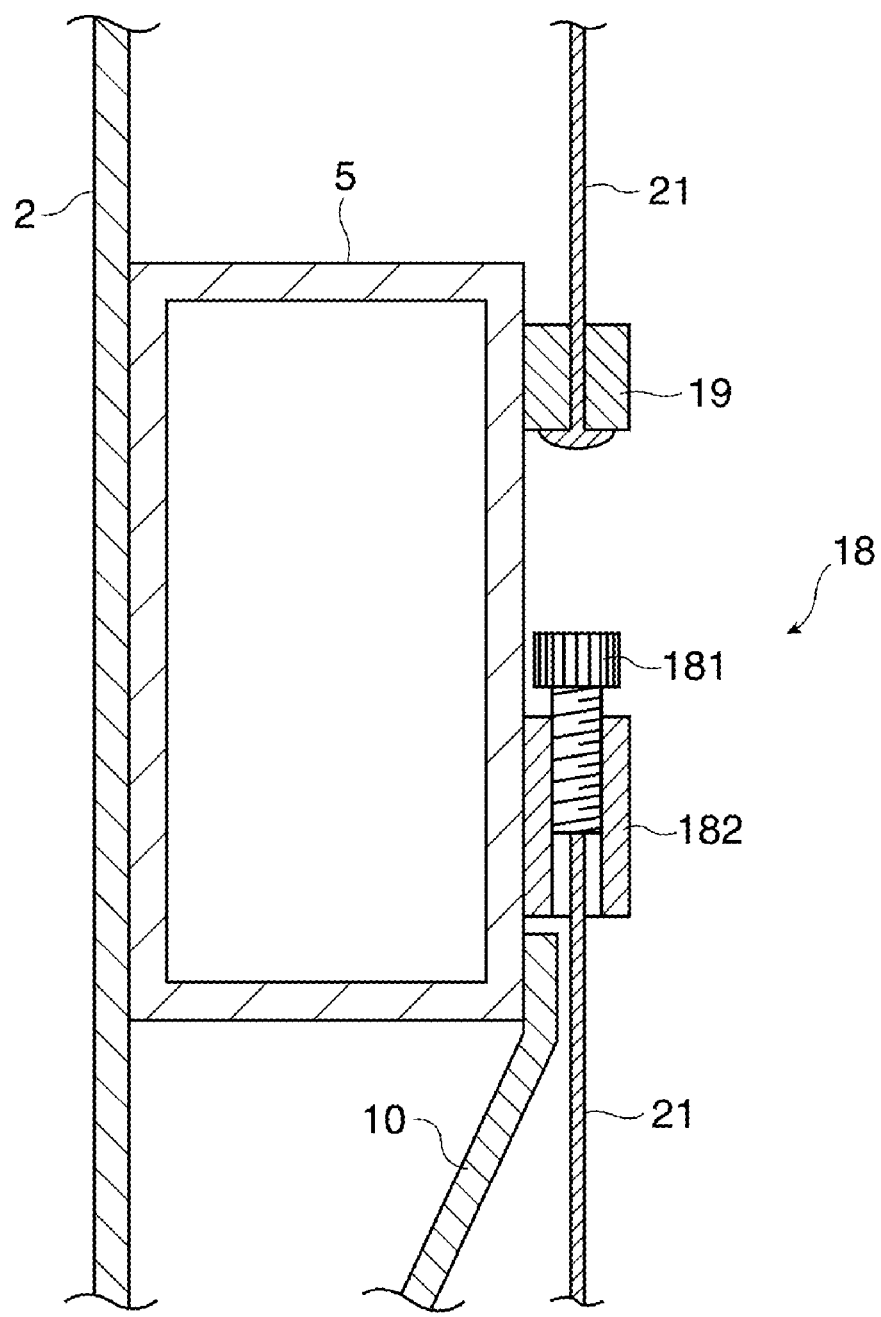
FIG. 17 schematically shows an outline configuration of a screw adjustment mechanism in a sixth embodiment.

FIG. 17 schematically shows a configuration of a screw adjustment mechanism 18 acting as an adjustment mechanism in the sixth embodiment.

In this embodiment, the screw adjustment mechanism 18 is attached to a rear surface side position of each support 3 to 5. Also, it is also acceptable to attach three screw adjustment mechanisms 18, one each to the support 3 and every second support therebelow. In FIG. 17, the support 5 (FIG. 14), among the supports 3 to 5, is shown enlarged.

The screw adjustment mechanism 18 includes a screw 181 and a nut 182 with which the screw 181 comes into threaded engagement. The screw adjustment mechanism 18, by causing a wire 21 acting as a regulation member to move in and out in a direction (up-down direction) in which the supports 3 to 5 move closer to and away from each other, changes the rear corner-to-corner dimension $L_1$, making the rear corner-to-corner dimension $L_1$ approximately identical to the front corner-to-corner dimension $L_2$. By this means, the flatness of the screen main body 2 is adjusted.

One end of the wire 21 acting as the regulation member is connected to the screw 181. The other end of the wire 21 is connected, via an adjustment member 19, to each support 3 to 5 differing from the support 5 to which is attached the screw adjustment mechanism 18. The screw 181 is in threaded engagement with the nut 182 and, by rotating the screw 181, the wire 21 is moved in and out in an up-down direction.

The nut 182 is fixed to the rear surface of each support 3 and 5.

The adjustment member 19 fixes a direction of the wire 21 relative to the floor plane in such a way as to cause the wire 21 attached to the leading end of the screw 181 to hang vertically toward the floor plane.

According to the sixth embodiment heretofore described, apart from the advantage of the fifth embodiment, there is the following advantage.

In this embodiment, each support 3 and 5 being provided with the screw adjustment mechanism 18, the screw adjustment mechanism 18 includes the screw 181 to which the wire 21 is connected, and the nut 182 in threaded engagement with the screw 181. According to this, on each user rotating the screw 181 of each screw adjustment mechanism 18, as the one end of the wire 21 is moved in and out in an up-down direction, it is possible to increase and reduce the rear corner-to-corner dimension $L_1$. Consequently, by making the rear corner-to-corner dimension $L_1$ approximately identical to the front corner-to-corner dimension $L_2$, it is possible to improve the flatness of the projection surface of the screen main body 2.

For example, in the case in which tension is applied in an up-down direction of the screen main body 2, the tension of the screen main body 2 between the supports 3 and 4 becoming highest with the self-weight of the supports 4 and 5 added thereto, the rear corner-to-corner dimension $L_1$ between the support 3 and the support 4 becomes largest. On the other hand, the tension of the screen main body 2 between the supports 4 and 5 becomes lowest. In this kind of case too, according to the screw adjustment mechanism 18, as the rear corner-to-corner dimension $L_1$ between adjacent supports 3 to 5 is adjusted by operating the screw 181 in accordance with a difference in tension between pairs of adjacent supports 3 to 5, it is possible to freely adjust the flatness of the projection surface of the screen main body 2.

Seventh Embodiment

Next, a description will be given, based on the drawings, of a seventh embodiment of the invention.

Figures 18A, 18B:
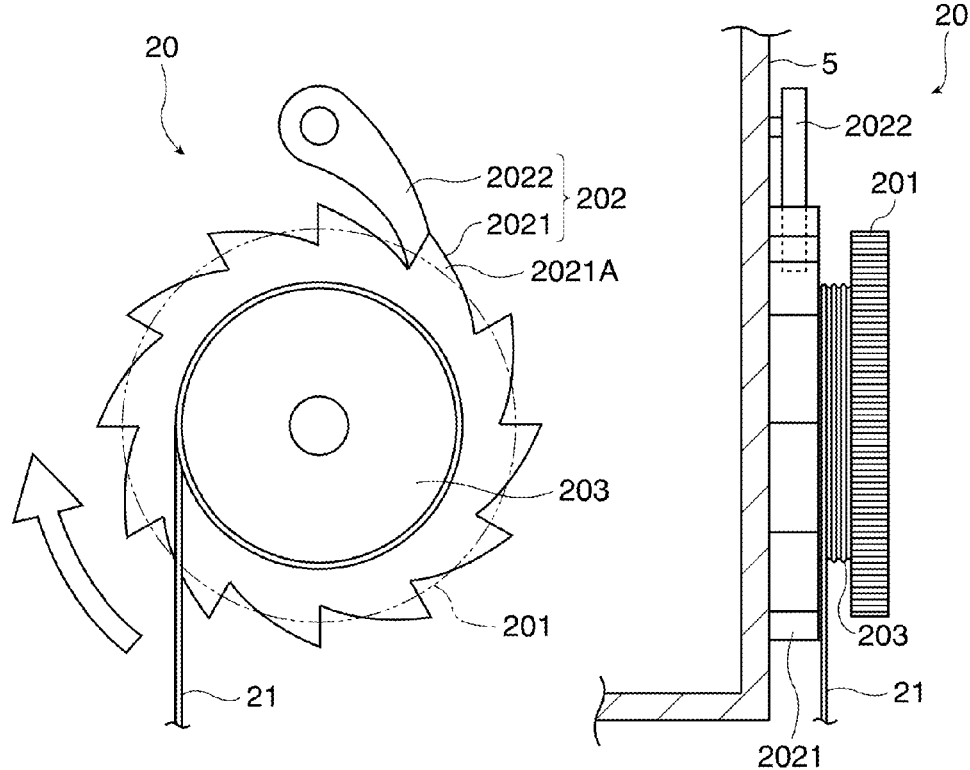
FIGS. 18A and 18B schematically show an outline configuration of a dial adjustment mechanism in a seventh embodiment.

FIGS. 18A and 18B schematically show a configuration of a dial adjustment mechanism 20 acting as an adjustment mechanism in the seventh embodiment and, more specifically, FIG. 18A is a front view of the dial adjustment mechanism 20, while FIG. 18B is a side view of the dial adjustment mechanism 20 showing a condition in which it is attached to the support 5.

This embodiment being one wherein the dial adjustment mechanism 20 is used instead of the screw adjustment mechanism 18 in the sixth embodiment, three dial adjustment mechanisms 20 are attached one to each of the support 3 and every second support therebelow, in the same way as in the sixth embodiment. In FIGS. 18A and 18B, the support 5 (FIG. 14), among the supports 3 to 5, is illustrated enlarged.

The dial adjustment mechanism 20 includes a dial 201, a ratchet mechanism 202, and a spindle 203. The ratchet mechanism 202 includes a rack 2021 and a pawl 2022.

The dial 201, by being rotationally operated by the user, rotates the rack 2021 via the spindle 203, unwinding and winding the wire 21 in an up-down direction. The dial 201 is rotatably attached to the ratchet mechanism 202 via the spindle 203.

The rack 2021 of the ratchet mechanism 202 rotates in accordance with a direction in which the dial 201 is rotated. The rack 2021, being formed in a disk shape, includes a plurality of teeth 2021A in a circumferential direction.

The pawl 2022, on coming into engagement with a tooth 2021A of the rack 2021, sets a rotating direction of the rack 2021 to a clockwise direction, while the pawl 2022, on coming out of engagement with a tooth 2021A, sets a rotating direction of the rack 2021 to a counterclockwise direction.

The spindle 203 connects the dial 201 and the ratchet mechanism 202, and the wire 21 is wound around the spindle 203.

According to this configuration, in FIG. 18A, the rack 2021 is arranged in such a way as to rotate clockwise by the pawl 2022 coming into engagement with a tooth 2021A of the rack 2021, winding the wire 21 around the spindle 203. In order to cause a counterclockwise rotation, on the dial 201 being rotated counterclockwise by bringing the pawl 2022 out of engagement with a tooth 2021A, the wire 21 is unwound toward the floor plane.

According to the seventh embodiment heretofore described, in the case in which tension is applied in an up-down direction of the screen main body 2, using the dial adjustment mechanism 20 which is of a simple configuration, by adjusting the rear corner-to-corner dimension $L_1$ by operating the dial 201, making the rear corner-to-corner dimension $L_1$ approximately identical to the front corner-to-corner dimension $L_2$ in the same way as in the sixth embodiment, it is possible to suppress a curvature of the screen main body 2.

The invention not being limited to the previously described embodiments, modifications, improvements, and the like which are made without departing from the scope of the invention are incorporated in the invention.

In the previously described first embodiment to third embodiment, as the first support fixing mechanism 8, the pantograph mechanism shown in FIGS. 3 and 5 has been employed, but it is also acceptable to employ other configurations.

Figure 19A:
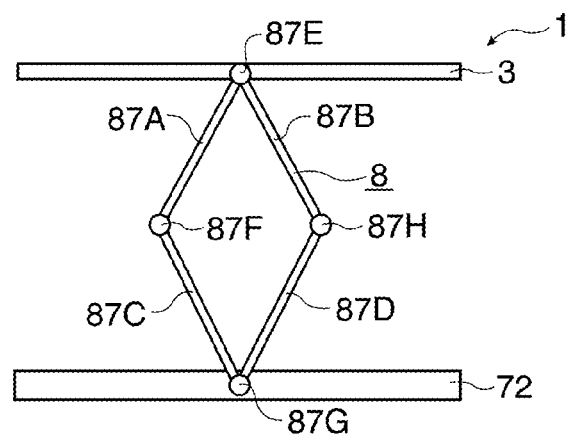
FIGS. 19A to 19C show a modification example of the first support fixing mechanism in each previously described embodiment.
Figure 19B:
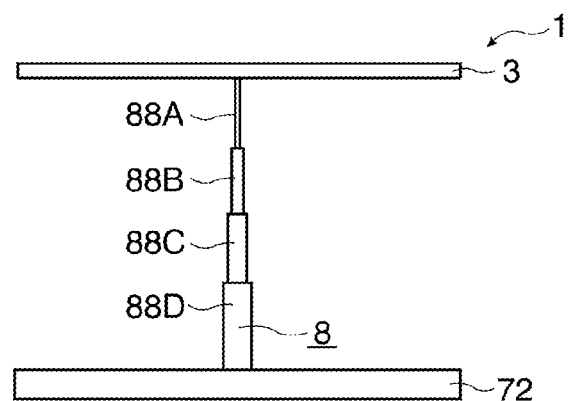
Figure 19C:
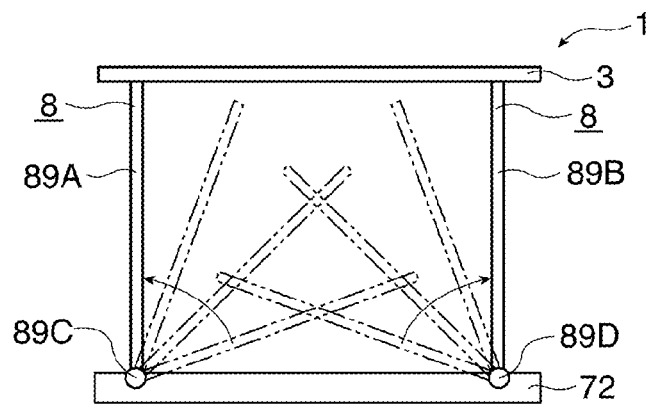

FIGS. 19A to 19C show modification examples of the first support fixing mechanism 8.

In each of FIGS. 19A to 19C, for the sake of description, as components of the screen 1, only the first support 3, base plate 72, and first support fixing mechanism 8 are illustrated.

For example, as the first support fixing mechanism 8, it is also acceptable to employ the pantograph mechanism shown in FIG. 19A. Specifically, with the first support fixing mechanism 8, as shown in FIG. 19A, four arms 87A to 87D are linked so as to be pivotable around fulcrums 87E to 87H in such a way as to form an approximate diamond shape, and the mutually opposed fulcrums 87E and 87G are respectively attached to the first support 3 and the base plate 72.

Then, in the stretched condition, the first support fixing mechanism 8 extends, and maintains the height position of the first support 3 by means of a friction or the like between each arm 87A to 87D and each fulcrum 87E to 87H.

Also, for example, as the first support fixing mechanism 8, it is also acceptable to employ the rod mechanism shown in FIG. 19B. Specifically, as shown in FIG. 19B, the first support fixing mechanism 8 having four tubular members 88A to 88D, all of differing diameters, wherein one is inserted into a tubular interior of another, an overall length is made changeable. Also, with the first support fixing mechanism 8, the tubular member 88A positioned on one end side is connected to the first support 3, and the tubular member 88D positioned on the other end side is connected to the base plate 72.

Then, in the stretched condition, the first support fixing mechanism 8 extends, and maintains the height position of the first support 3 by means of a friction or the like between the tubular members 88A to 88D.

Furthermore, for example, as the first support fixing mechanism 8, it is also acceptable to employ the mechanism shown in FIG. 19C. Specifically, as shown in FIG. 19C, the first support fixing mechanism 8 includes two columns 89A and 89B. The two columns 89A and 89B are attached to the base plate 72 via fulcrums 89C and 89D respectively, in such a way as to be rotatable around axes perpendicular to the projection surface.

Then, in the housed condition, each column 89A and 89B is set so as to become parallel to the base plate 72. Meanwhile, in the stretched condition, each column 89A and 89B is set so as to become perpendicular to the base plate 72, bringing the other end of each column 89A and 89B into abutment with the lower surface of the first support 3. For this reason, in the stretched condition, the height position of the first support 3 is maintained by the first support fixing mechanism 8.

In each previously described embodiment, as the entanglement prevention mechanism 10, the configuration shown in FIGS. 8A and 8B has been employed, but it is also acceptable to employ other configurations.

Figure 20A:
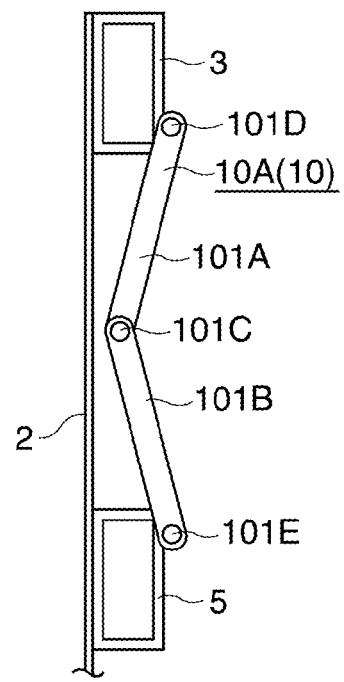
FIGS. 20A and 20B show a modification example of the entanglement prevention mechanism in each previously described embodiment.
Figure 20B:
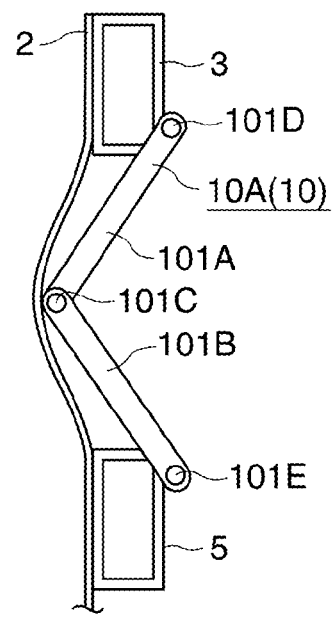

FIGS. 20A and 20B show a modification example of the entanglement prevention mechanism 10. FIGS. 20A and 20B correspond to FIGS. 8A and 8B, illustrating the entanglement prevention mechanism 10A.

For example, as the entanglement prevention mechanism 10, it is also acceptable to employ the linkage mechanism shown in FIGS. 20A and 20B. Specifically, as shown in FIGS. 20A and 20B, the entanglement prevention mechanism 10 includes a pair of arms 101A and 101B. As well as one end of one of the arms 101A and 101B being linked to one end of the other at a fulcrum 101C in such a way that the pair of arms 101A and 101B is bendable, the pair of arms 101A and 101B bridges adjacent supports 3 to 5 via fulcrums 101D and 101E in a condition in which it is bent to the front side in advance in the stretched condition shown in FIG. 20A.

Then, on the supports 3 to 5 moving closer to each other from the stretched condition shown in FIG. 20A, as shown in FIG. 20B, the pair of arms 101A and 101B bends to the front side, pressing a portion of the screen main body 2 not connected to each support 3 to 5 to the front side.

In each previously described embodiment, the screen 1 has been configured in such a way that the portion of the screen main body 2 not connected to each support 3 to 5 bends to the front side, but it is also acceptable that the portion bends to the rear side.

Figure 21A:
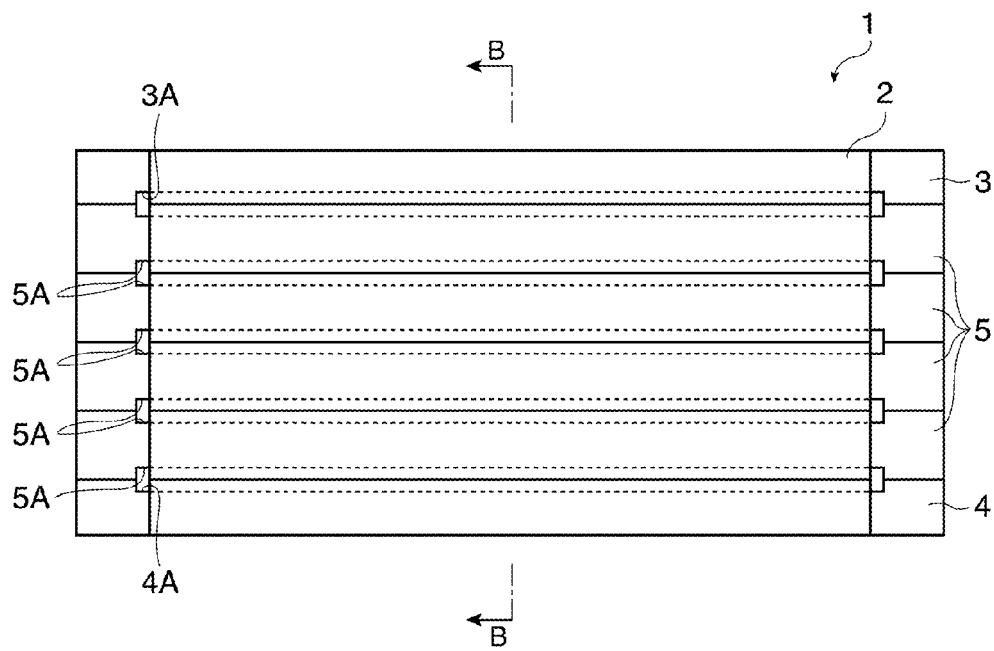
FIGS. 21A and 21B show a modification example of each previously described embodiment.
Figure 21B:
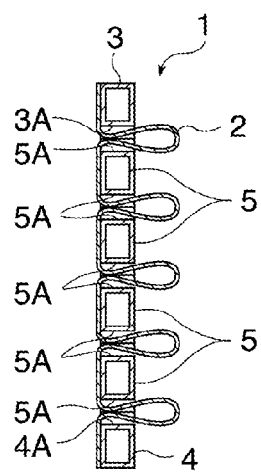

FIGS. 21A and 21B show a modification example of each previously described embodiment. Specifically, FIG. 21A shows the screen 1 in the housed condition as viewed from the front side, and FIG. 21B is a sectional view taken along line B-B of FIG. 21A.

In FIGS. 21A and 21B, for the sake of description, as components of the screen 1, only the screen main body 2 and supports 3 to 5 are illustrated.

That is, as shown in FIGS. 21A and 21B, each support 3 to 5 has a longer dimension than a width dimension of the screen main body 2 in a left-right direction. Then, in each support 3 to 5, notches 3A, 4A, and 5A having a larger dimension than the width dimension of the screen main body 2 in a left-right direction are formed in portions of the supports 3 to 5 (the lower surface of the first support 3, the upper surface of the second support 4, and both upper and lower surfaces of each auxiliary support 5), each of which comes into abutment with an adjacent support when setting the housed condition.

Then, on setting the housed condition, as shown in FIGS. 21A and 21B, as well as adjacent supports 3 to 5 coming into abutment with each other, the portions of the screen main body 2 not connected to the supports 3 to 5 bend to the rear side through the notches 3A, 4A, and 5A.

FIGS. 22A and 22B, and FIGS. 23A and 23B, show modification examples of the entanglement prevention mechanism 10. FIGS. 22A and 22B, and FIGS. 23A and 23B, correspond to FIGS. 8A and 8B, and FIGS. 20A and 20B, illustrating the entanglement prevention mechanism 10A.

Herein, the entanglement prevention mechanism 10 shown in each previously described embodiment or FIGS. 20A and 20B is of a configuration wherein the portions of the screen main body 2 not connected to the supports 3 to 5 are pressed to the front side. For this reason, when employing the configuration shown in FIGS. 21A and 21B, for example, the entanglement prevention mechanism 10 shown in FIGS. 22A and 22B or FIGS. 23A and 23B is employed, rather than employing the entanglement prevention mechanism 10 shown in FIGS. 8A and 8B or FIGS. 20A and 20B.

Figure 22A:
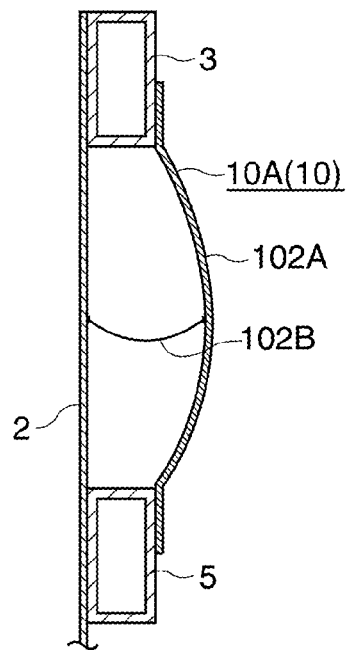
FIGS. 22A and 22B show a modification example of the entanglement prevention mechanism in each previously described embodiment.
Figure 22B:
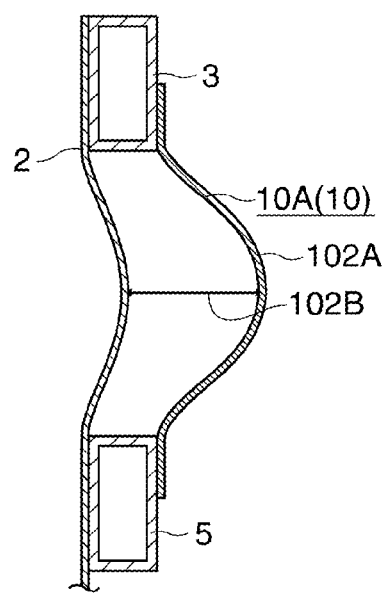

For example, as shown in FIGS. 22A and 22B, the entanglement prevention mechanism 10 includes a flexible member 102A and a string-like body 102B.

The flexible member 102A, being the same kind as that of the entanglement prevention mechanism 10 shown in FIGS. 8A and 8B, is configured of PET or the like. Then, as shown in FIG. 22A, the flexible member 102A bridges adjacent supports 3 to 5 in a condition in which an approximately central portion thereof in an up-down direction is caused to tend to bend to the rear side in advance.

The string-like body 102B connects the rear surface of the portion of the screen main body 2 not connected to each support 3 to 5, and the flexible member 102A.

Then, on the supports 3 to 5 moving closer to each other from the stretched condition shown in FIG. 22A which is a condition in which the string-like body 102B is loose, as shown in FIG. 22B, the approximately central portion of the flexible member 102A in an up-down direction bends to the rear side and, in response to the bending of the flexible member 102A, the string-like body 102B pulls the portion of the screen main body 2 not connected to each support 3 to 5 to the rear side.

Figure 23A:
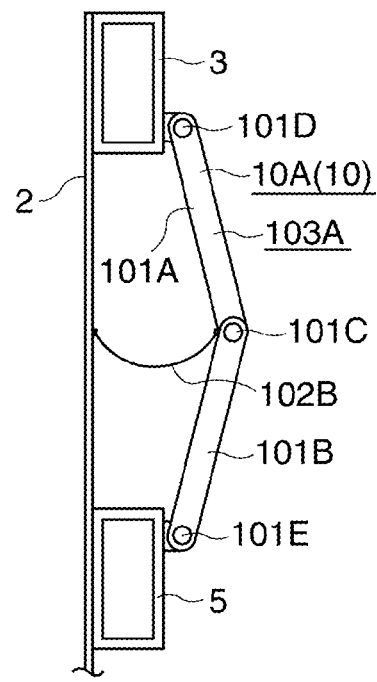
FIGS. 23A and 23B show a modification example of the entanglement prevention mechanism in each previously described embodiment.
Figure 23B:
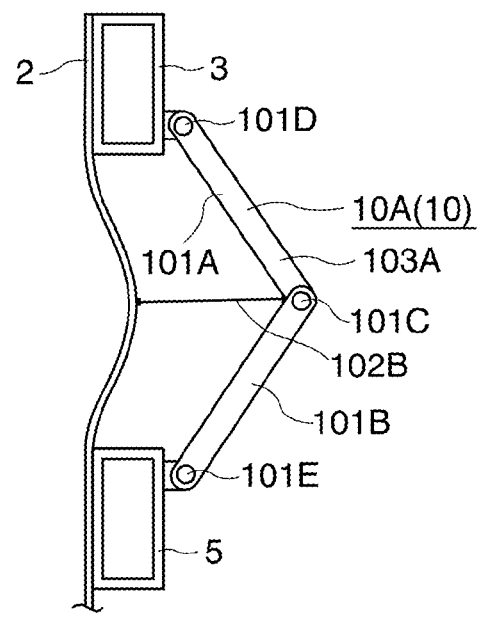

Also, for example, as shown in FIGS. 23A and 23B, the entanglement prevention mechanism 10 includes a linkage mechanism 103A and a string-like body 102B.

The linkage mechanism 103A is the same kind as that of the entanglement prevention mechanism 10 shown in FIGS. 20A and 20B. Then, the linkage mechanism 103A bridges adjacent supports 3 to 5 in a condition in which it is bent to the rear side in advance in the stretched condition shown in FIG. 23A.

The string-like body 102B connects the rear surface of the portion of the screen main body 2 not connected to each support 3 to 5, and the fulcrum 101C.

Then, on the supports 3 to 5 moving closer to each other from the stretched condition shown in FIG. 23A which is a condition in which the string-like body 102B is loose, as shown in FIG. 23B, the pair of arms 101A and 101B bends to the rear side and, in response to the bending of the pair of arms 101A and 101B, the string-like body 102B pulls the portion of the screen main body 2 not connected to each support 3 to 5 to the rear side.

In the first embodiment, the screen 1 has been installed on the floor plane but, without being limited to this, it is also acceptable to adopt a configuration wherein it is installed on the ceiling plane. That is, a configuration is adopted wherein the housing 7 is fixed to the ceiling plane and, when setting the stretched condition, the first support 3 is pulled down.

In the same way, in the fourth embodiment, the screen 1 has been installed on the ceiling plane but, without being limited to this, it is also acceptable to adopt a configuration wherein it is installed on the floor plane. That is, a configuration is adopted wherein the first support 3 is installed on the floor plane, and the wire 14 is connected to the ceiling plane.

In the second embodiment, as the slide 11, a low friction material such as fluorine resin has been employed but, without being limited to this, it is also acceptable to employ other configurations, for example, a caster.

In the fourth embodiment, a configuration has been adopted wherein the hook 141 is attached to one end of the wire 14 and, in the stretched condition, the hook 141 is hooked on the hook engagement portion 16 attached to the floor plane but, without being limited to this, it is also acceptable to employ other configurations.

For example, a sucker configured of rubber, synthetic resin, or the like is attached to one end of the wire 14. Then, in the stretched condition, the sucker is caused to adhere to the floor plane or the like by suction.

In each previously described embodiment, the linkage mechanism 6 has bridged adjacent supports 3 to 5 but, without being limited to this, it is also acceptable that it bridges two of the supports 3 to 5 which are not adjacent to each other. For example, it is also acceptable that it bridges the first support 3 and the second support 4.

In the first embodiment to the third embodiment, the configuration of the second support regulation mechanism 9 not being limited to the configuration shown in FIG. 6, it is also acceptable to employ other configurations, for example, the same kind of configuration as that of the distancing position changing mechanism 13 shown in FIG. 12, or FIGS. 13A and 13B.

In the same way, in the fourth embodiment, the configuration of the distancing position changing mechanism 13 not being limited to the configuration shown in FIGS. 12, 13A, and 13B, it is also acceptable to employ other configurations, for example, the same kind of configuration as that of the second support regulation mechanism 9 shown in FIG. 6.

In the fourth embodiment, as the configuration of the screen 1, a configuration has been adopted wherein the housing 7 is omitted but, without being limited to this, it is also acceptable to adopt a configuration wherein the housing 7 is provided. In this case, unlike the first embodiment to the third embodiment, the housing 7 is provided on the first support 3 side, and attached to the ceiling plane.

In each previously described embodiment, the number and disposition positions of auxiliary supports 5, linkage mechanisms 6, second support regulation mechanisms 9, entanglement prevention mechanisms 10, distancing position changing mechanisms 13, regulation members 17, screw adjustment mechanisms 18, and dial adjustment mechanisms 20, not being limited to the number and disposition positions described in each previously described embodiment, it is also acceptable to adopt other numbers and disposition positions.

Figure 24:
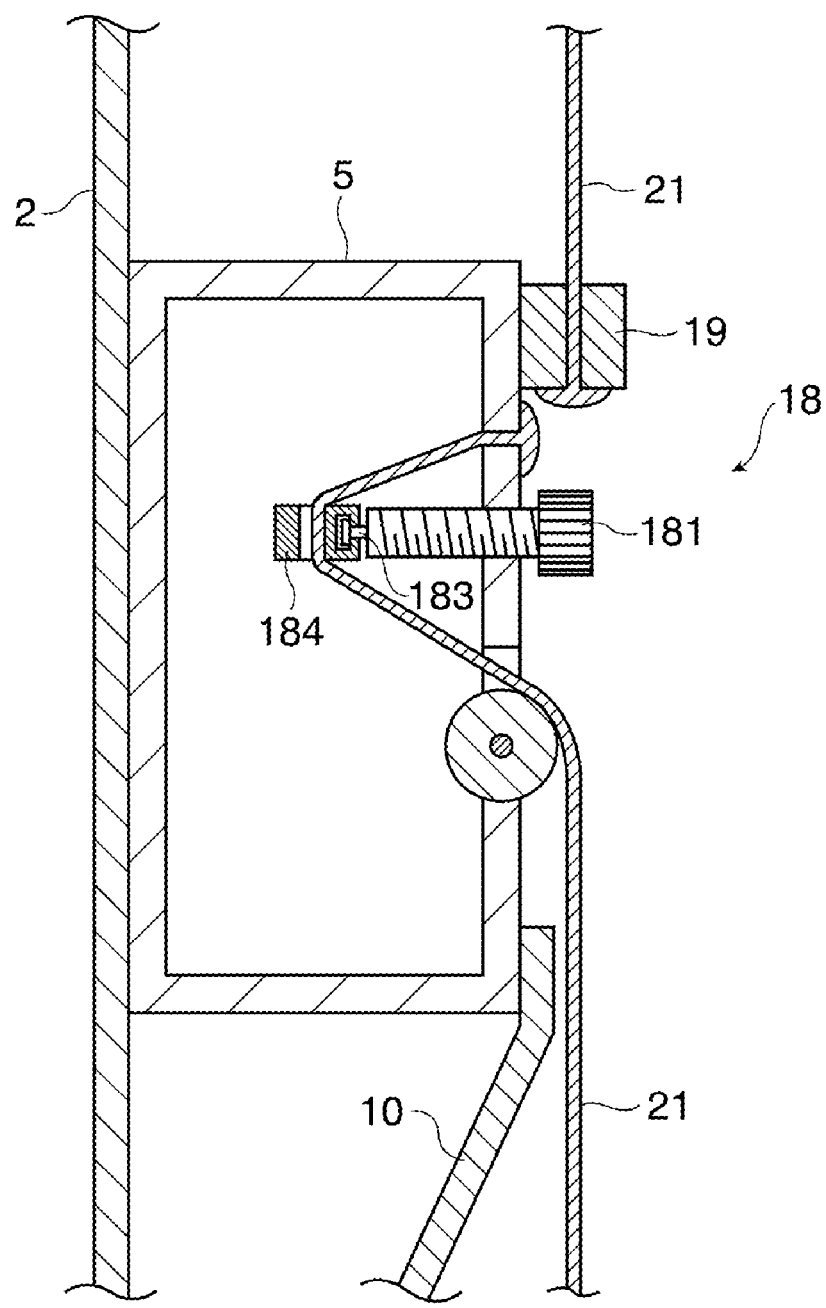
FIG. 24 shows a modification example of the screw adjustment mechanism in the sixth embodiment.

FIG. 24 shows a modification example of the screw adjustment mechanism 18 of the sixth embodiment. In FIG. 24, the support 5, among the supports 3 to 5, is illustrated enlarged.

The screw adjustment mechanism 18 shown in FIG. 24 includes a screw 181, a rotary shaft 183 coming into engagement with the leading end of the screw 181, and an insertion member 184 through which the wire 21 is inserted.

One end of the wire 21 is attached to the rear surface of the support 5, and the other end is attached to the support 5 differing from the heretofore described support 5.

The screw 181 comes into perpendicular threaded engagement with, and passes through, the rear surface of the support 5. The rotary shaft 183 is in engagement with the leading end of the screw 181.

One end of the rotary shaft 183 is connected to the leading end of the screw 181, and the other end of the rotary shaft 183 is brought into loose engagement with the insertion member 184.

According to this configuration, on rotating the screw 181, the rotary shaft 183 rotates together with the screw 181, pressing the insertion member 184, or pulling the insertion member 184 to the rear side, and the wire 21 moves in and out in an up-down direction in conjunction with a movement of the insertion member 184. Consequently, in this configuration too, in the case in which tension is applied in an up-down direction of the screen main body 2, by causing the wire 21 to move in and out in an up-down direction by means of the screw adjustment mechanism 18, it being possible to freely set the rear corner-to-corner dimension $L_1$, it is possible to improve the flatness of the screen main body 2.

In the fifth embodiment, the rear corner-to-corner dimension $L_1$ of the regulation member 17 has been set so as to be approximately identical to the front corner-to-corner dimension $L_2$, but it is also acceptable to set the rear corner-to-corner dimension $L_1$ so as to be larger than the front corner-to-corner dimension $L_2$. In this case, the rear corner-to-corner dimension $L_1$ of the regulation member 17 is set in such a way that an allowable dimension (a dimension by which the approximately central portion of the screen main body 2 is curved to the rear side) $L_3$ shown in FIG. 16A is 3 mm or less in the stretched condition of the screen main body 2, and the regulation member 17 bridges adjacent supports 3 to 5. The allowable dimension $L_3$ is constant even in the event that a screen size differs.

With the screen of some aspects of the invention, as well as it being possible to efficiently maintain the flatness of the projection surface, as it is possible to easily carry the screen, the screen can be utilized as a screen onto which is projected an image light projected and magnified from a projector or the like.

The entire disclosure of Japanese Patent Application Nos. 2008-150420, filed Jun. 9, 2008 and 2008-248090, filed Sep. 26, 2008 are expressly incorporated by reference herein.

What is claimed is:

1. A screen comprising:
    a flexible screen main body, having a projection surface, onto which an image light is projected;
    a first support and a second support, each of which extend along one of a pair of opposed edges of the screen main body, each supporting one of the pair of opposed edges;
    an auxiliary support which, being disposed between the first support and the second support, extends parallel to the first support and the second support, and supports a pair of intersecting edges intersecting with the pair of opposed edges of the screen main body;
    linkage mechanisms which, bridging adjacent supports among the first support, the second support, and the auxiliary support, as well as regulating a movement of the adjacent supports in an out-of-plane direction of the projection surface of the screen main body, extend and contract in a direction in which the adjacent supports face each other, bringing the adjacent supports closer to and away from each other; and
    a plurality of adjustment mechanisms connected to the second support and extending from the second support in a direction away from the first support, the adjustment mechanisms facilitating an adjustment in a distance between the first support and the second support and a change in a tension applied to the screen main body.

2. The screen according to claim 1, comprising:
    entanglement prevention mechanisms which, bridging the adjacent supports, in a condition in which the adjacent supports are close to each other, bend to the screen main body side, and press the screen main body to the front side.

3. The screen according to claim 1, wherein
    the first support and the second support each support one of the pair of horizontally intersecting edges of the screen main body, and
    in a condition in which the screen is installed on a floor plane in an installation space of the screen, the lower ends of the adjacent supports come into abutment with the floor plane.

4. The screen according to claim 1, wherein
    the first support and the second support each support the pair of horizontally intersecting edges of the screen main body, the screen comprising:
    a rail member which, extending toward the first support from the second support, supports the lower ends of the adjacent supports, wherein the first support and the auxiliary support slide on the rail member.

5. The screen according to claim 1, further comprising:
a regulation member which, having flexibility, bridges rear surfaces of the adjacent supports, wherein
the regulation member regulates a curving of the screen main body toward a rear side in a stretched condition in which the first support and the second support are away from each other, and tension is applied to the screen main body.

6. The screen according to claim 5, wherein
the adjacent supports have identical approximately rectangular shapes in cross-section, and
the regulation member, in the stretched condition, sets a rear corner-to-corner dimension between mutually opposed corners of the adjacent supports on the rear side so as to be approximately identical to a front corner-to-corner dimension between mutually opposed corners of the adjacent supports on the front side.

7. The screen according to claim 5, further comprising:
an adjustment mechanism on the rear surface of at least one of the adjacent supports, wherein
one end of the regulation member is connected to the adjustment mechanism,
the other end of the regulation member is connected to the rear surface of the support differing from the at least one of the adjacent supports, and
the adjustment mechanism causes one end side of the regulation member to move in and out in a direction in which the adjacent supports move closer to and away from each other, changing a rear corner-to-corner dimension.

8. The screen according to claim 1, wherein the plurality of adjustment mechanisms are comprised of second support regulation mechanisms each having a first end and a second end, the first ends connected to the second support and the second ends connected to a housing for storing the screen main body in a collapsed state.

9. The screen according to claim 8, wherein:
the screen main body, the adjacent supports, and the linkage mechanisms are housed in the housing in a condition in which the adjacent supports are close to each other; and
a first support fixing mechanism which, when the first support is taken out of the housing, is connected to the housing and the first support, fixing a distancing position of the first support from the housing.

10. The screen according to claim 9, wherein:
the second support regulation mechanism regulates a movement of the second support in a direction away from the housing.

11. The screen according to claim 10, wherein
an insertion hole, passing through in a direction in which the adjacent supports face each other through which to insert one portion of the second support regulation mechanism, is formed in the second support, and wherein
the second support regulation mechanism further includes:
a restriction body, one end of which is connected to the housing; and
an adjustment body which comes into threaded engagement with the other end of the restriction body, wherein
when the first support is taken out of the housing, as well as coming into abutment with a peripheral portion of the insertion hole, regulating a movement of the second support in a direction away from the housing, moves closer to and away from the housing by a condition of threaded engagement with the restriction body being changed, changing the distancing position of the second support from the housing.

12. The screen according to claim 11, comprising:
a reception member of which one end is fixed to the peripheral portion of the insertion hole, and the other end comes into abutment with the adjustment body, wherein
at least one of the adjustment body and the reception member has a tapered surface coming into abutment with the other.

13. The screen according to claim 9, wherein the first support fixing mechanism is connected to the housing and the first support in a manner so as not to be connected with the second support and the auxiliary support.

14. The screen according to claim 1, wherein the plurality of adjustment mechanisms are comprised of distancing position changing mechanisms each having a first end and a second end, the first ends connected to the second support and the second ends connected to one of a floor plane and a ceiling plane.

15. The screen according to claim 14, wherein the distancing position changing mechanisms each comprise a wire and a winding mechanism including a casing, a drum, a spring, and an adjustment shaft.

16. The screen according to claim 14, wherein
the first support is installed on one of the floor plane and the ceiling plane in an installation space of the screen, and
the distancing position changing mechanisms bridge the other one of the floor plane and the ceiling plane and the second support.

17. The screen according to claim 1, comprising entanglement prevention mechanisms which bridge the adjacent supports and are configured such that when the adjacent supports are close to each other the entanglement prevention mechanisms bend away from the screen main body and pull the screen main body away from the front side of the screen main body.

18. The screen according to claim 1, wherein the plurality of adjustment mechanisms extending from the second support are substantially parallel to each other.

19. A screen comprising:
a main body onto which an image light is projected;
a first support unit and a second support unit that support both edges of a vertical direction of the main body;
a plurality of auxiliary support units which, being disposed between the first support unit and the second support unit in parallel, support a horizontal direction of the main body;
linkage mechanisms which, being bridged among each support unit, move the auxiliary support units closer to and away from each other, and
a plurality of adjustment mechanisms connected to the second support unit and extending horizontally from the second support in a direction away from the first support unit, the adjustment mechanisms facilitating an adjustment in a distance between the first support unit and the second support unit and a change in a tension applied to the main body.

* * * * *